United States Patent
Kondo et al.

(10) Patent No.: US 10,511,702 B2
(45) Date of Patent: Dec. 17, 2019

(54) INFORMATION PROCESSING DEVICE AND INFORMATION PROCESSING METHOD

(71) Applicant: SONY CORPORATION, Tokyo (JP)

(72) Inventors: Masao Kondo, Kanagawa (JP);
Hirotaka Tako, Kanagawa (JP);
Hidenori Karasawa, Kanagawa (JP);
Kenichi Yamaura, Kanagawa (JP);
Yoshihito Ohki, Tokyo (JP); Yoshiyasu Kubota, Kanagawa (JP); Tomohiro Ishii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/060,691

(22) PCT Filed: Nov. 8, 2016

(86) PCT No.: PCT/JP2016/083049
§ 371 (c)(1),
(2) Date: Jun. 8, 2018

(87) PCT Pub. No.: WO2017/115558
PCT Pub. Date: Jul. 6, 2017

(65) Prior Publication Data
US 2018/0367659 A1    Dec. 20, 2018

(30) Foreign Application Priority Data

Dec. 28, 2015   (JP) .................. 2015-257394

(51) Int. Cl.
*H04M 3/00*    (2006.01)
*H04M 1/725*   (2006.01)
(Continued)

(52) U.S. Cl.
CPC ........ *H04M 1/7253* (2013.01); *G06F 1/1694* (2013.01); *G06F 3/002* (2013.01);
(Continued)

(58) Field of Classification Search
CPC ....... H04W 88/02; H04W 88/06; H04W 4/02; H04W 76/02; H04W 92/02; H04W 84/18; H04W 8/005
(Continued)

(56) References Cited

U.S. PATENT DOCUMENTS

2012/0075672 A1   3/2012   Oishi
2013/0169546 A1*  7/2013   Thomas ............... G06F 9/4451
                                                 345/173

FOREIGN PATENT DOCUMENTS

| JP | 2009-010486 A | 1/2009 |
| JP | 2012-095266 A | 5/2012 |
| JP | 2013-135307 A | 7/2013 |

OTHER PUBLICATIONS

International Search Report and Written Opinion of PCT Application No. PCT/JP2016/083049, dated Jan. 10, 2017, 09 pages of ISRWO.

* cited by examiner

*Primary Examiner* — Temica M Beamer
(74) *Attorney, Agent, or Firm* — Chip Law Group

(57) ABSTRACT

To provide an information processing device, information processing method, and program that make it possible to improve convenience at the time of operation with regard to an operation target. The information processing device includes: an operation target selecting section that cancels a selected state of a target selected as an operation target on a basis of detection of a posture of an object; and a lock control section that changes a condition for cancelling the selected state on a basis of a predetermined determination criterion.

20 Claims, 12 Drawing Sheets

(51) Int. Cl.
*H04M 11/00* (2006.01)
*H04Q 9/00* (2006.01)
*G06F 3/0346* (2013.01)
*G06F 3/00* (2006.01)
*G06F 3/01* (2006.01)
*H04M 1/32* (2006.01)
*G08C 17/02* (2006.01)
*G06F 1/16* (2006.01)
*H04N 21/41* (2011.01)
*G06F 3/0484* (2013.01)

(52) U.S. Cl.
CPC ............ *G06F 3/016* (2013.01); *G06F 3/0346* (2013.01); *G08C 17/02* (2013.01); *H04M 1/32* (2013.01); *H04M 1/7258* (2013.01); *H04M 1/72533* (2013.01); *H04M 11/00* (2013.01); *H04N 21/4126* (2013.01); *H04Q 9/00* (2013.01); *G06F 3/04847* (2013.01); *G06F 2200/1637* (2013.01); *G08C 2201/32* (2013.01); *G08C 2201/50* (2013.01); *G08C 2201/91* (2013.01)

(58) Field of Classification Search
USPC ............................ 455/420, 422.1, 41.2, 41.3
See application file for complete search history.

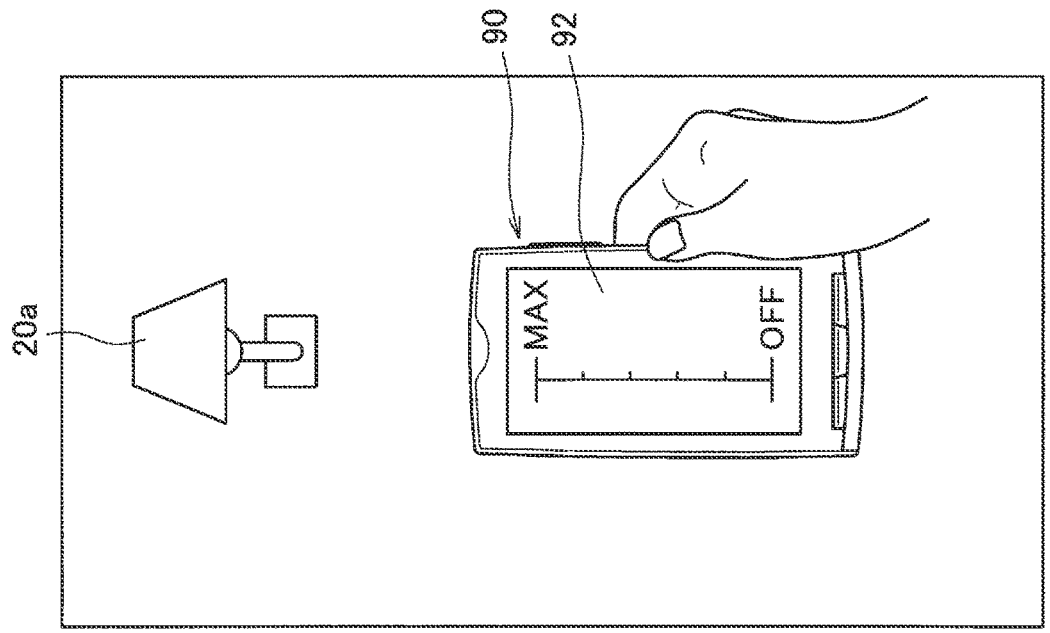
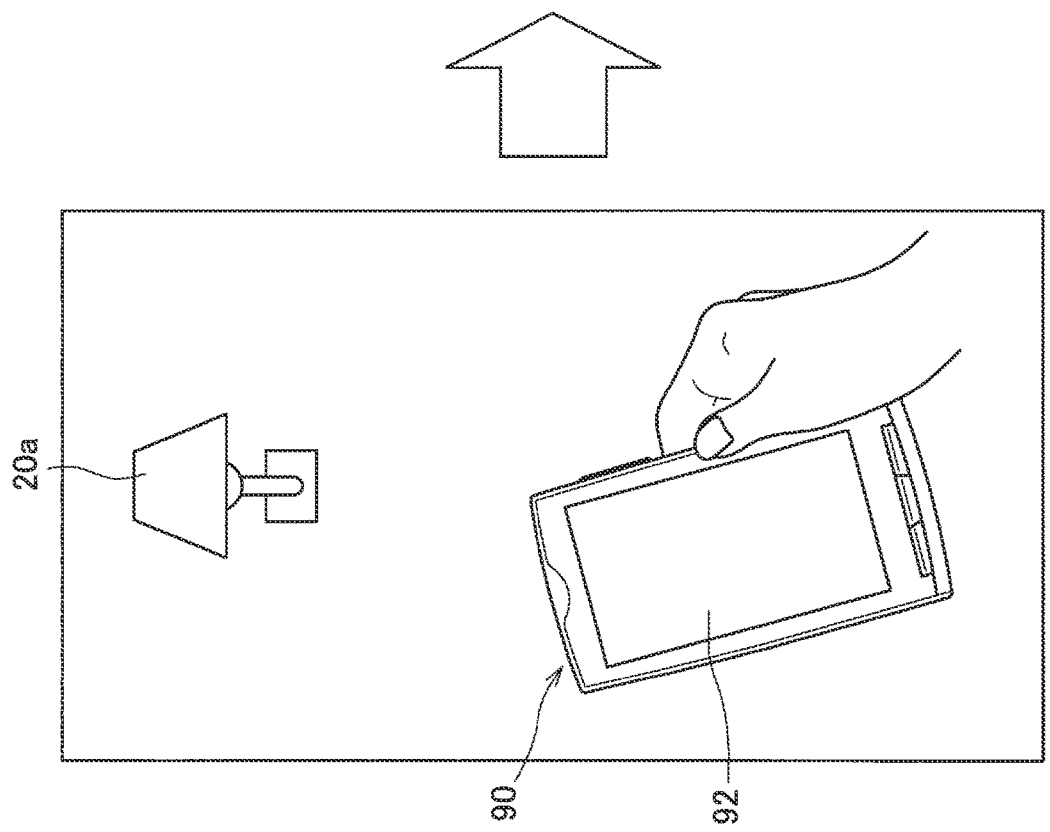

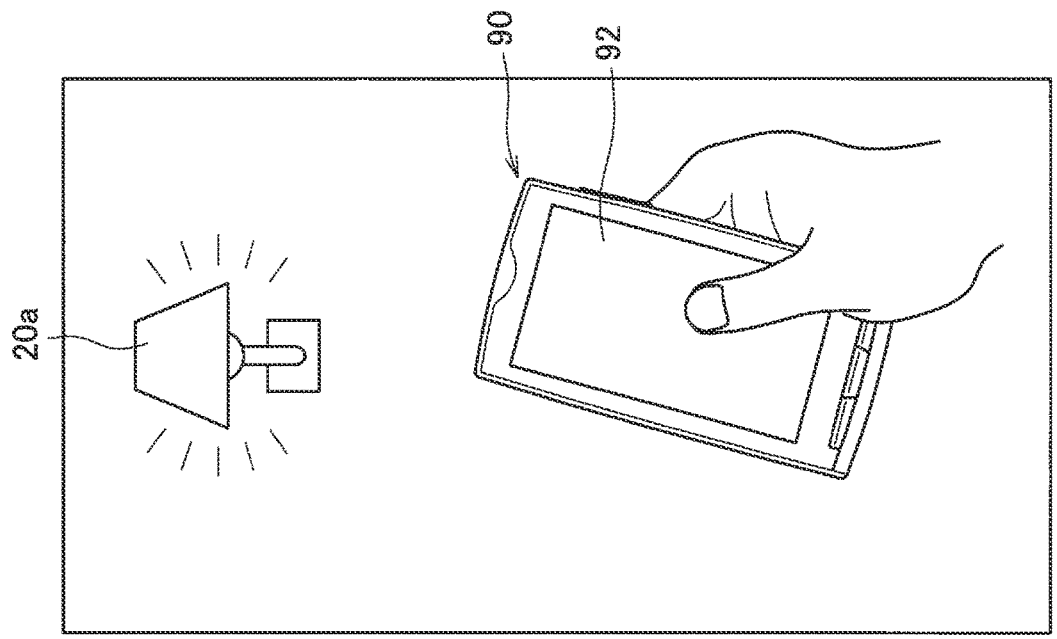
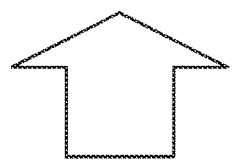
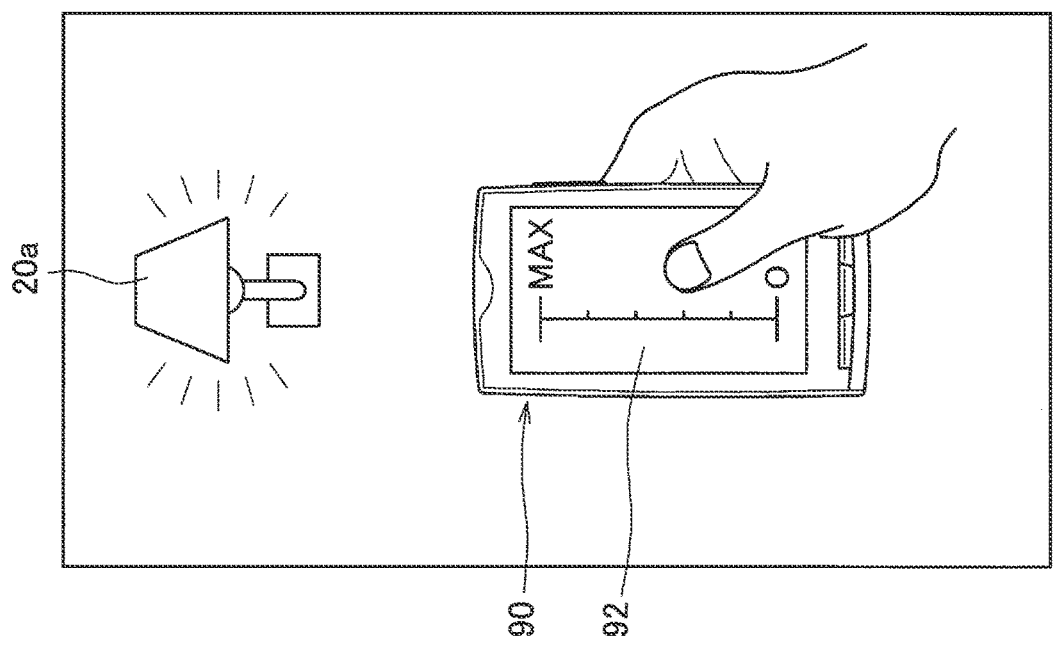
FIG. 3A
FIG. 3B

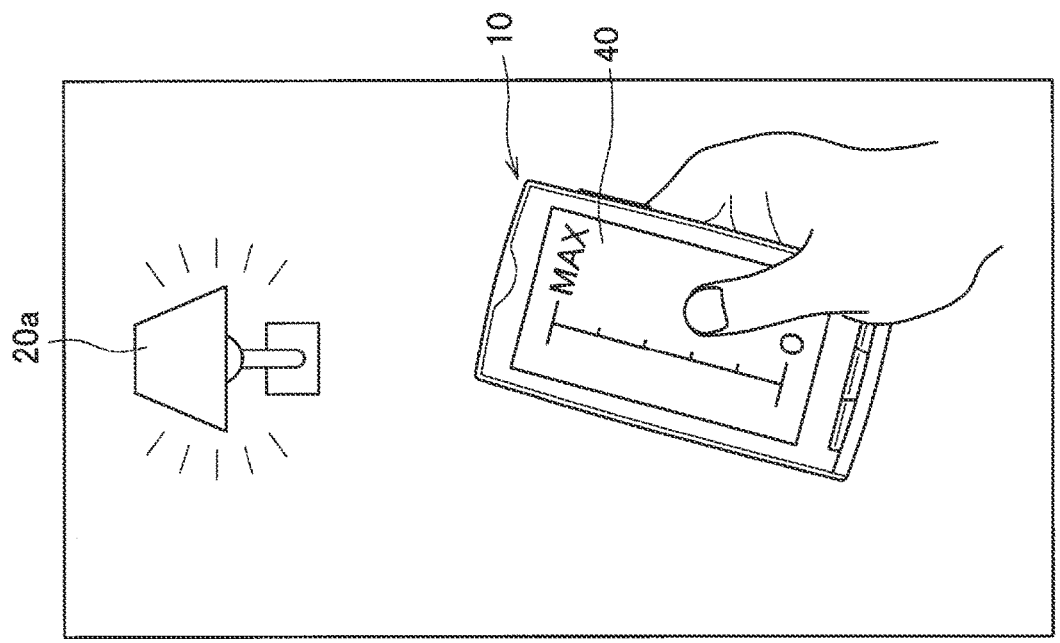
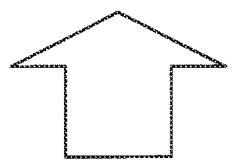
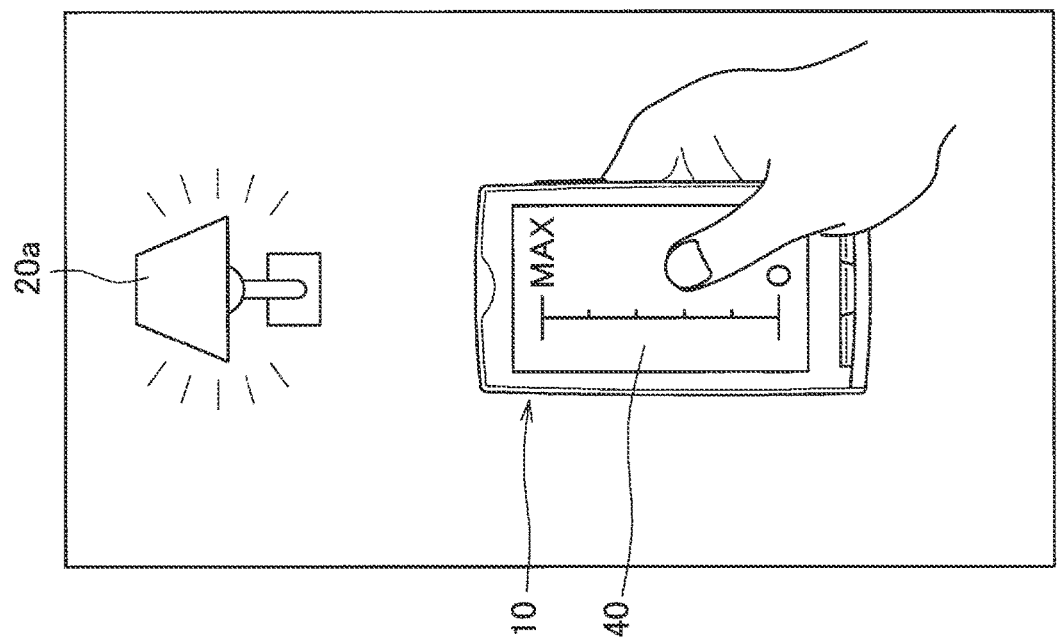
FIG. 5A
FIG. 5B

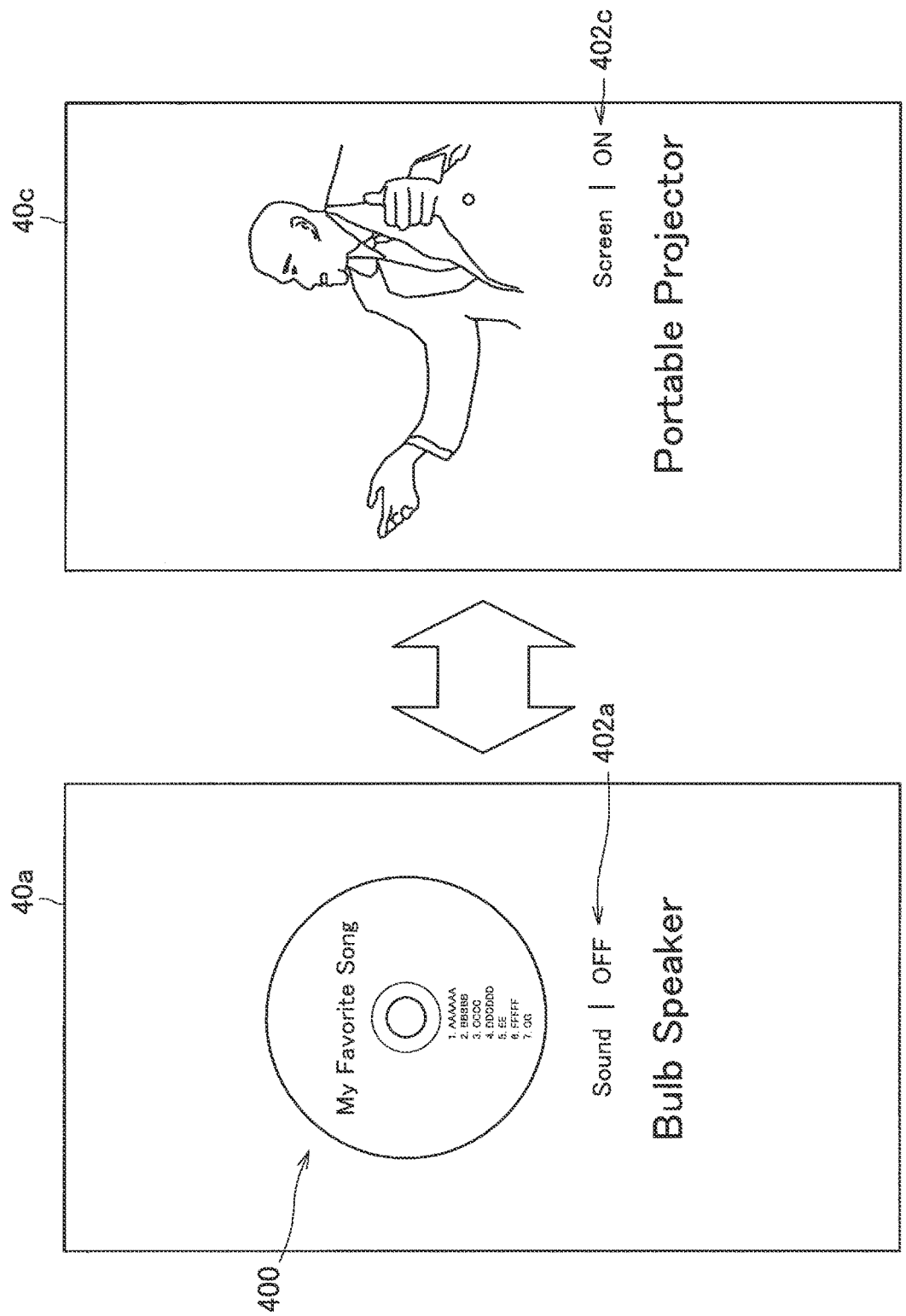

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/083049 filed on Nov. 8, 2016, which claims priority benefit of Japanese Patent Application No. JP 2015-257394 filed in the Japan Patent Office on Dec. 28, 2015. Each of the above-referenced applications is hereby incorporated herein by reference in its entirety.

TECHNICAL FIELD

The present disclosure is related to an information processing device, an information processing method, and a program.

BACKGROUND ART

Hitherto, for example, techniques have been developed that controls the action of various types of devices, such as a light, a television receiver, or a speaker on the basis of operation for a smart phone or a remote controller.

Moreover, for example, techniques have been also proposed that makes it possible to switch over control-target devices of a remote controller. For example, in Patent Literature 1, a technique is described that switches over control-target devices of a remote controller sequentially for each time when it is determined that the acceleration of a remote controller is a predetermined value or more.

CITATION LIST

Patent Literature

Patent Literature 1: JP 2013-135307A

DISCLOSURE OF INVENTION

Technical Problem

By the way, during operation for a terminal, such as a remote controller, the terminal may move suddenly by a motion of a hand under the operation. For example, it is difficult to maintain the posture of a terminal due to the vibration of a hand and the like. For this reason, it is difficult to perform operation for a terminal while maintaining the posture of the terminal.

In such a case, with the technique described in Patent Literature 1, the control target device of the remote controller is switched over. Thus, in the technique described in Patent Literature 1, the convenience at the time of operation with regard to the control target device is low.

Then, in the present disclosure, a novel and improved information processing device, information processing method, and program are proposed that make it possible to improve convenience at the time of operation with regard to an operation target.

Solution to Problem

According to the present disclosure, there is provided an information processing device including: an operation target selecting section that cancels a selected state of a target selected as an operation target on a basis of detection of a posture of an object; and a lock control section that changes a condition for cancelling the selected state on a basis of a predetermined determination criterion.

In addition, according to the present disclosure, there is provided an information processing method including: cancelling a selected state of a target selected as an operation target on a basis of detection of a posture of an object; and changing a condition for cancelling the selected state on a basis of a predetermined determination criterion by a processor.

In addition, according to the present disclosure, there is provided a program that makes a computer function as: an operation target selecting section that cancels a selected state of a target selected as an operation target on a basis of detection of a posture of an object; and a lock control section that changes a condition for cancelling the selected state on a basis of a predetermined determination criterion.

Advantageous Effects of Invention

As described above, according to the present disclosure, it is possible to improve the convenience at the time of operation with regard to an operation target. In this regard, the effects described here are not necessarily limited, and any of the effects described in the present disclosure may be permissible.

BRIEF DESCRIPTION OF DRAWINGS

FIGS. 2A and 2B are explanatory illustrations showing a part of a processing example of a mobile terminal 90 according to Comparative example in the present disclosure.

FIGS. 3A and 3B are explanatory illustrations showing a part of a processing example of a mobile terminal 90 according to the same Comparative example.

FIGS. 5A and 5B are explanatory illustrations showing an example where a device 20 is locked for the mobile terminal 10 according to the same embodiment.

FIGS. 8A and 8B are explanatory illustrations showing a UI example according to the same embodiment.

MODE(S) FOR CARRYING OUT THE INVENTION

Figure 1:
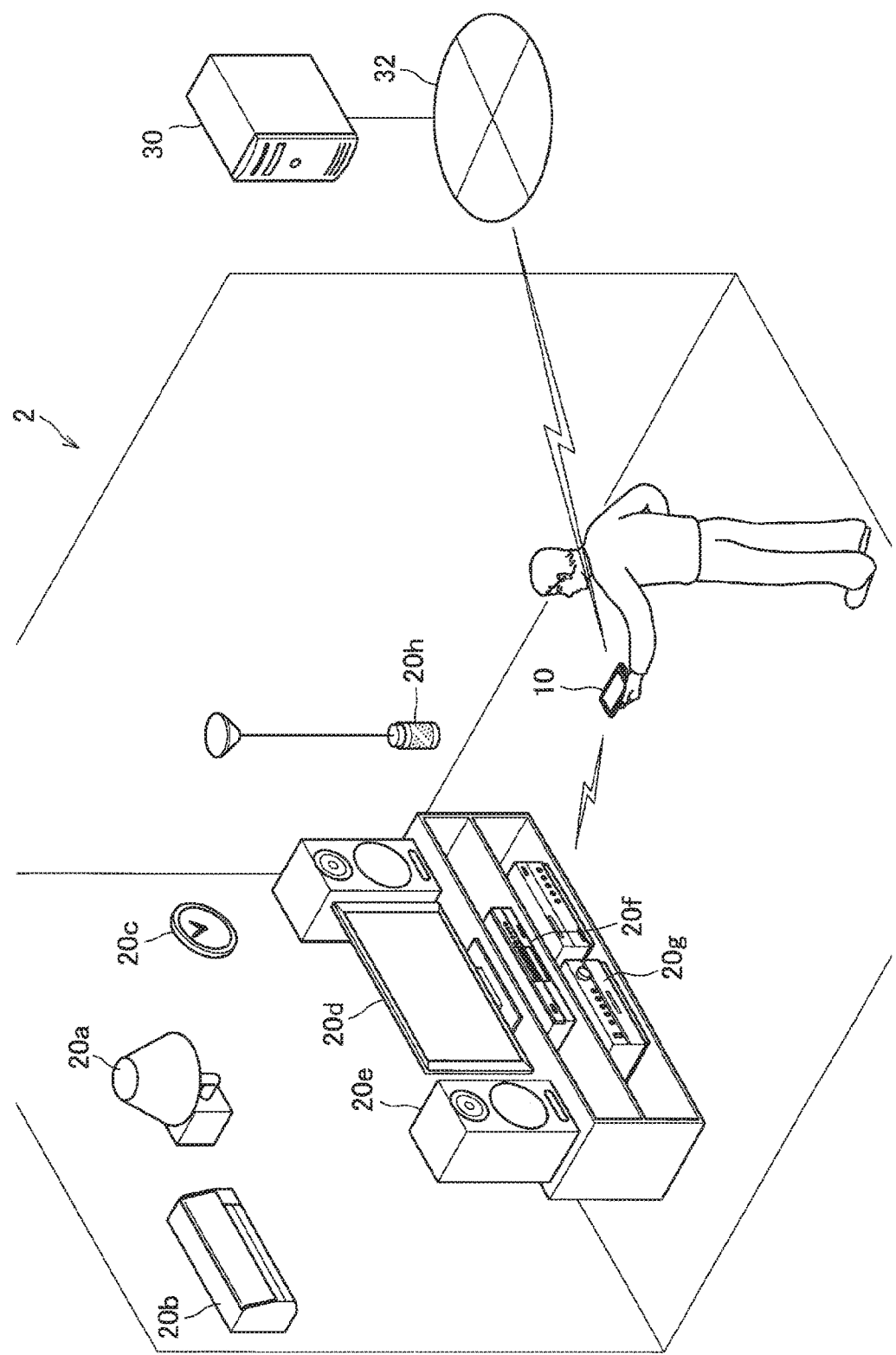
FIG. 1 is an explanatory illustration showing a constitution example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, in the present specification and drawings, a plurality of constitutional elements including substantially the same functional constitution may be distinguished by attaching different alphabets after the same sign. For example, a plurality of constitutions including substantially the same functional constitution are distinguished in a manner like a device 20a and a device 20b if needed. However, in the case where there is no need to distinguish specifically each of a plurality of constitution elements including substantially the same functional constitution, only the same code is attached. For example, in the case where there is no need to distinguish a device 20a and a device 20b especially, they are merely referred to as a device 20.

Moreover, the concerned "Mode for Carrying Out the Invention" is described in accordance with the item order shown below.
1. Constitution of information processing system
2. Detailed description of embodiment
3. Hardware constitutions
4. Modified example

1. Constitution of Information Processing System

<1-1. Basic Constitution>

First, the basic constitution of the information process system according to the present embodiment is described with reference to FIG. 1. As shown in FIG. 1, the information process system according to the present embodiment includes a mobile terminal 10, a plurality of devices 20, a server 30, and a communication network 32.

1-1-1. Mobile Terminal 10

The mobile terminal 10 is an example of an information processing device and an object in the present disclosure. The mobile terminal 10 is a device for controlling the operation of one or more devices 20 arranged in a predetermined space. Although details will be mentioned later, the mobile terminal 10 selects a device 20 located in a direction indicated by the mobile terminal 10 as an operation target, and, can perform control for the concerned operation target. For example, the mobile terminal 10 can control the device 20 on the basis of a user's operation so as to turn ON or OFF the power source of the device 20 of the operation target, or, to change the value of a parameter with regard to the corresponding device 20, for example, illuminance, temperature, sound volume, and the like.

Here, the predetermined space is, for example, a room 2 as shown in FIG. 1. However, without being limited to such an example, the predetermined space may be an indoor region, or a predetermined outdoor region other than the room 2.

Moreover, the mobile terminal 10 can perform communication with the device 20 and the server 30 via wireless communication or cable communication. For example, the mobile terminal 10 transmits control signals for controlling the operation of the device 20 to the device 20.

1-1-1-1. Detection of Posture

Moreover, the mobile terminal 10 can acquire information with regard to the posture of the mobile terminal 10. For example, the mobile terminal 10 can specify the posture of the mobile terminal 10 on the basis of measurement results by a triaxial acceleration sensor, a gyro sensor, or a geomagnetic sensor (measurement section 122 mentioned later) that are built in the mobile terminal 10. Alternatively, for example, in the case where a predetermined marker (i.e., explicit sign), such as a two-dimensional bar code and a blinking light emitter like an LED (Light Emitting Diode), are installed on the wall etc. of the room 2, the mobile terminal 10 can specify the posture of the mobile terminal 10 by calculating the relative direction of the mobile terminal 10 to the concerned marker on the basis of the photographed image of the concerned marker by the camera built in the mobile terminal 10. In this connection, the sign used for calculating the relative direction is not limited to the predetermined marker, and, for example, may be a characteristic point (i.e., un-explicit sign) in the rooms 2, such as a wall. Alternatively, the mobile terminal 10 can specify the posture of the mobile terminal 10 by using the measurement result by a camera, a laser range sensor (or 3D scanner), etc. of the mobile terminal 10 and the technique of SLAM (Simultaneous Localization and Mapping). Alternatively, the mobile terminal 10 can also specify the posture of the mobile terminal 10 relatively by outputting a predetermined sound toward a wall etc. from a speaker built in the mobile terminal 10 and detecting the echoing sound with a microphone built in the mobile terminal 10.

Alternatively, the mobile terminal 10 can specify the posture of the mobile terminal 10 by acquiring a photographed image of the mobile terminal 10 photographed by a camera (hereafter, may be referred to as an environmental camera) arranged inside the room 2. Alternatively, the mobile terminal 10 can specify the posture of the mobile terminal 10 on the basis of a photographed image in which visible light or infrared light transmitted from the mobile terminal 10 is photographed by the environmental camera. Here, the environmental camera may be an independent device or may be included in the device 20, such as, for example, a television receiver.

1-1-1-2. Detection of Position

Moreover, the mobile terminal 10 can acquire information with regard to the position of the mobile terminal 10. For example, the mobile terminal 10 includes a built-in positioning device that receives positioning signals from positioning satellites such as GPS (Global Positioning System) and performs positioning for the current position, and, can specify the position of the mobile terminal 10 on the basis of positioning results by the concerned positioning device. Alternatively, the mobile terminal 10 can measure the position of the mobile terminal 10 relatively on the basis of the detection of information transmitted from a predetermined transmitter (not shown) arranged in the inside or outside of the room 2.

For example, the mobile terminal 10 specifies the position of the mobile terminal 10 by receiving position information from each of a plurality of transmitters (an access point of Wi-Fi (registered trademark), a Bluetooth (registered trademark) device, etc.) and performing a trigonometrical survey on the basis of the intensity of the radio wave received from each of the concerned transmitters. Alternatively, data base (not shown) may be prepared in which the identification information of each of a plurality of transmitters installed in the area where the room 2 is located and the position information of each of the transmitters are correlated with each other and registered beforehand. In the above case, the mobile terminal 10 acquires the position information of each of the transmitters of the transmission sources of the received radio waves by accessing the concerned data base, and then, the mobile terminal 10 can specify the position of the mobile terminal 10 on the basis of the acquired position information of each of the transmitters and the intensity of the radio wave received from each of the concerned transmitters.

Alternatively, the mobile terminal 10 can also specify the position of the mobile terminal 10 by photographing light (in place of radio waves) transmitted from a predetermined transmitter by the camera of the mobile terminal 10 and acquiring the position information of the transmitter encoded in the light. For example, the mobile terminal 10 can acquire the position information of a transmitter encoded in light by analyzing the information regarding the blink patterns and intensity of light transmitted from a predetermined transmitter. Alternatively, the mobile terminal 10 can specify the position of the mobile terminal 10 relatively by outputting a predetermined sound toward a wall etc. and detecting the echoing sound.

Alternatively, the mobile terminal 10 can also specify the position of the mobile terminal 10 on the basis of measurement results by various kinds of sensors arranged inside the room 2. For example, the mobile terminal 10 can specify the position of the mobile terminal 10 on the basis of the photographed image of the mobile terminal 10 or a user by the environmental camera arranged inside the room 2 and the position information of the environmental camera. Alternatively, in the case where a pressure sensor is installed in a sofa, a chair, etc. arranged inside the room 2, the mobile terminal 10 may specify on the basis of the measurement result by the concerned pressure sensor that the user is sitting on the sofa, or the chair (that is, the position of the mobile terminal 10 is in the vicinity of the position of the sofa or the chair). Alternatively, in the case where a plurality of pressure sensors is installed under a floor, the mobile terminal 10 can also specify the position of the mobile terminal 10 by specifying a place where a user is located, on the basis of the measurement result by the plurality of concerned pressure sensors. In this connection, without being limited to the measurement result by the pressure sensor, the mobile terminal 10 can also use the measurement result by the other types of sensors, for example, such as an infrared sensor.

Modified Example

It should be noted that, in the above-described description, although the description has been given for the example in which the mobile terminal 10 specifies the posture and position of the mobile terminal 10, it should not be limited to the above example. For example, it is also possible for the other devices such as the server 30 to specify the posture and position of the mobile terminal 10 by acquiring the measurement result by the mobile terminal 10 or various types of sensors arranged in the room 2.

1-1-1-3. Configuration of Mobile Terminal 10

It should be noted that although FIG. 1 shows the example where the mobile terminal 10 is a smart phone, it should not be limited to the above example. For example, the mobile terminal 10 may be a tablet terminal, a portable music player, or a portable game machine. Alternatively, the mobile terminals 10 may be wearable device, for example, such as a head mound display, an eyewear, a wristband, and a smart watch. Alternatively, the mobile terminal 10 may be a dedicated remote controller for operating the device 20. This remote controller includes an operation unit for operating one or more kinds of devices 20, and the concerned operation unit includes, for example, a button, a dial, a lever, a switch or the like.

1-1-2. Device 20

The device 20 is, for example, an electronic device arranged inside the room 2. As shown in FIG. 1, the device 20 is, for example, a lighting device 20a (i.e., a bracket light, a ceiling light, etc.), an air conditioner 20b, a clock 20c, a television receiver 20d, a speaker 20e, a set-top box 20f with a recording function, an audio player 20g, or a bulb speaker (a speaker-integrated type light) 20h. Alternatively, the device 20 may be a robot (drone etc.), a vehicle (a car or a bicycle), a general-purpose PC (Personal Computer), a game machine, or a dimming device (curtain or blind).

In this regard, the position information of each of the devices 20 in the room 2 may be registered beforehand in, for example, the server 30 and the like. Alternatively, the server 30 can specify the positional relationship of each of the devices 20 in the room 2 on the basis of three-dimensional information regarding the room 2 acquired beforehand. Specific contents will be mentioned later.

1-1-3. Server 30

The server 30 is a device that manages various kinds of information. For example, the server 30 correlates each of the devices 20 arranged in the room 2 with the position information of each of the devices 20 registered beforehand, and, memorizes. The server 30 may correlate further the posture information of each of the devices 20, and, memorizes.

Alternatively, the server 30 constitutes the point cloud of the room 2 on the basis of measurement results by a plurality of depth cameras arranged in the room 2, and, can also memorize the information regarding the constituted point cloud. With this, it becomes possible to specify three-dimensional information of each of the devices 20 and the mobile terminal 10 in the room 2, and it becomes possible to specify the positional relationship between each of the devices 20 and the mobile terminal 10.

1-1-4. Communication Network 32

The communication network 32 is a wired or wireless transmission path of information transmitted from devices connected to the communication network 32. For example, the communication network 32 may include public networks, such as a telephone network, Internet, and a satellite communication network; various types of LAN (Local Area Network) including Ethernet (registered trademark), WAN (Wide Area Network), and the like. Moreover, the communication network 32 may include leased line networks, such as IP-VPN (Internet Protocol-Virtual Private Network).

<1-2. Summarize of Problem>

In the above description, the constitution of the information processing system according to the present embodiment has been described. Here, in order to show the features of the present disclosure clearly, description is given for a processing example of a mobile terminal 90 according a comparative example in the present disclosure with reference to FIGS. 2A, 2B, 3A, and 3B. This mobile terminal 90 can perform control for a selected device 20. Moreover, the mobile terminal 90 selects a device 20 of an operation target, or, cancels the selection on the basis of a direction indicated by the mobile terminal 90. Moreover, the mobile terminal 90 includes a touch display 92.

Each of FIGS. 2A, 2B, 3A, and 3B are explanatory illustrations showing an example of a scene where a user makes a lighting device 20a turn on by operating the mobile terminal 90. In this connection, FIG. 2A shows an initial state.

As shown in FIG. 2A, in the case where a direction indicated by the upper end portion of the mobile terminal 90 is separated more than a predetermined distance from the lighting device 20a, the mobile terminal 90 does not select the lighting device 20a. Then, as shown in FIG. 2B, in the case where the direction indicated by the mobile terminal 90 is directed to the lighting device 20a, the mobile terminal 90 selects the lighting device 20a as an operation target. Then, the mobile terminal 90, for example, makes the touch display 92 display a UI (User Interface) for adjusting the brightness of the lighting device 20a. With this, it becomes possible for a user to adjust the brightness of the lighting device 20a by operation for the touch display 92.

Thereafter, as shown in FIG. 3A, in the case where a touch operation for making the lighting device 20a turn on is performed for the UI displayed on the touch display 92, the mobile terminal 90 transmits a control signal for lighting up to the lighting device 20a on the basis of the detection result of the touch operation. With this, the lighting device 20a is lighted up. Moreover, the brightness of the lighting device 20a is adjusted correspondingly to a user's operation.

By the way, as shown in FIG. 3B, during the operation for the mobile terminal 90, a user's hand (for example, a finger, a wrist, etc.) moves unintentionally, and it may arise that the direction indicated by the mobile terminal 90 separates from the lighting device 20a. In such a case, the mobile terminal 90 cancels the selection of the lighting device 20a. As a result, it will become impossible suddenly for a user to perform the operation with regard to the lighting device 20a.

Then, on the basis of one of viewpoints derived from the above circumstances, it has led to create the mobile terminal 10 according to the present embodiment. In the case of having selected an operation target, the mobile terminal 10 can decide a condition for cancelling the selected state of the concerned operation target on the basis of a predetermined determination criterion. With this, the convenience at the time of operation with regard to an operation target can be improved.

2. Detailed Description of Embodiment

<2-1. Constitution>

Figure 4:
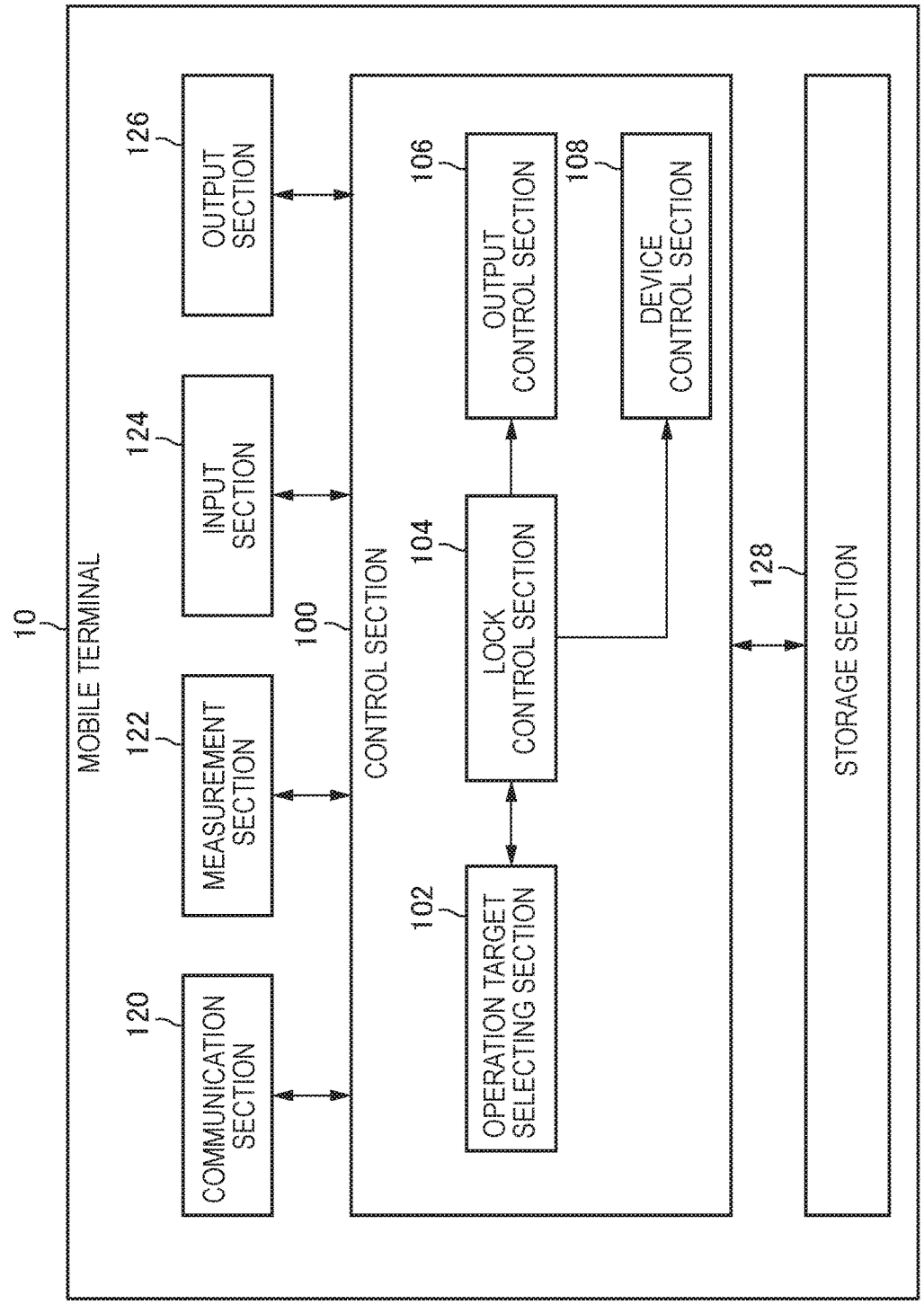
FIG. 4 is a functional block diagram showing a constitution example of a mobile terminal 10 according to the same embodiment.

Next, a constitution of the mobile terminal 10 according to the present embodiment is described in detail. FIG. 4 is a functional block diagram showing a constitution of the mobile terminal 10 according to the present embodiment. As shown in FIG. 4, the mobile terminal 10 includes a control section 100, a communication section 120, a measurement section 122, an input section 124, an output section 126, and a storage section 128.

2-1-1. Control Section 100

The control section 100 controls the operation of the mobile terminal 10 generally using later-mentioned hardware built in the mobile terminal 10, such as a CPU (Central Processing Unit) 150 and a RAM (Random Access Memory) 154.

Moreover, as shown in FIG. 4, the control section 100 includes an operation target selecting section 102, a lock control section 104, an output control section 106, and a device control section 108.

2-1-2. Operation Target Selecting Section 102

2-1-2-1. Selection of Operation Target

The operation target selecting section 102 selects an operation target from, for example, a plurality of devices 20 located in the room 2. In this regard, as mentioned later, in the case where an operation target has been selected, predetermined information may be output by control of the output control section 106.

For example, in the case where none of the devices 20 has been selected, the operation target selecting section 102 selects any one of the plurality of devices 20 as an operation target. Moreover, the operation target selecting section 102 selects any one of the plurality of devices 20 as an operation target on the basis of the detection of the posture of the mobile terminal 10. In this connection, the posture of the mobile terminal 10, as mentioned above, may be measured by the measurement section 122 (i.e., various types of sensors included in the mobile terminal 10), or may be measured by various types of sensors arranged in the room 2, such as an environmental camera.

As an example, the operation target selecting section 102 selects one device 20 located in the direction indicated by the mobile terminal 10 as an operation target from the plurality of devices 20.

Modified Example

It should be noted that, as a modified example, the operation target selecting section 102 can also select the plurality of devices 20 as an operation target. For example, in the case where it has been detected that the mobile terminal 10 is leaned upward (in a vertical direction), the operation target selecting section 102 may select a plurality of devices 20 of the same type (light in the present example) arranged in the rooms 2, such as a bracket light, a table light, and a bulb speaker 20h, in a lump as an operation target.

2-1-2-2. Cancellation of Selection of Operation Target

Moreover, in the case where "a condition for cancelling the selected state of an operation target" decided by the later-mentioned lock control section 104 has been satisfied, the operation target selecting section 102 cancels the selected state of an operation target. For example, in the case where an operation target has been locked by the lock control section 104, the lock of the concerned operation target is cancelled, and in the case where a condition for cancelling the selected state of the concerned operation target has been satisfied, the operation target selecting section 102 cancels the selected state of the concerned operation target. In this connection, as mentioned later, in the case where the selected state of the concerned operation target has been cancelled, predetermined information may be output by the control of the output control section 106. Moreover, the contents of the lock of an operation target will be mentioned later.

2-1-3. Lock Control Section 104

2-1-3-1. Decision of Condition for Cancelling Selected State of Operation Target The lock control section 104 decides a condition for cancelling the selected state of an operation target selected by the operation target selecting section 102 on the basis of predetermined determination criterion. Here, the predetermined determination criterion may include, for example, information with regard to the posture of the mobile terminal 10. Alternatively, the predetermined determination criterion may include the relationship between the direction indicated by the mobile terminal 10 and the position of an operation target. Alternatively, the predetermined determination criterion may include, for example, information with regard to an operation target, such as the type of the device 20 of the operation target. Alternatively, the predetermined determination criterion may include information with regard to detection of an operation instruction for an operation target. In this regard, the specific decision example of "a condition for cancelling the selected state of an operation target" will be mentioned later.

2-1-3-2. Start of Lock

Moreover, in the case where an operation target is selected by the operation target selecting section 102 and a lock start condition has been satisfied, the lock control section 104 locks the concerned operation target. Here, the phrase "to lock an operation target" means to loosen a condition of the posture of the mobile terminal 10 for cancelling the selected state of an operation target selected by the operation target selecting section 102. For example, for a change of the posture of the mobile terminal 10, it means to make the selected state of the concerned operation target into a state easier to be maintained, in other words, it means to make the selected state of the concerned operation target to a state more difficult to be cancelled. In this connection, the phrase "to lock an operation target" may include a case where, even if the posture of the mobile terminal 10 has changed, the selected state of the concerned operation target is not cancelled.

Moreover, as mentioned above, a condition (hereinafter, referred to as a lock cancel condition) for cancelling the lock of an operation target may be decided as a condition looser than "a condition for cancelling the selected state of an operation target".

For example, in the case where an operation target is selected, and a lock start condition has been satisfied, the lock control section 104 does not cancel the lock of the operation target until a lock cancel condition is satisfied. In this connection, as mentioned later, in the case where an operation target has been locked, predetermined information may be output by the control of the output control section 106.

Here, with reference to FIGS. 5A and 5B, the above-described contents are described more in details. FIGS. 5A and 5B is an explanatory illustration showing an example where, in a scene where a lighting device 20a has been selected as an operation target, the operation target is locked by the lock control section 104. First, in the case where a lock start condition has been satisfied, the lock control section 104 locks the lighting device 20a for the mobile terminal 10. With this, as shown in FIG. 5A, a UI for adjusting the brightness of the lighting device 20a is displayed on the display screen 40 of the mobile terminal 10 by the later-mentioned output control section 106.

Thereafter, as shown in FIG. 5B, for example, it is assumed that during the operation for the displayed UI, a user's hand moves unintentionally, and the indicating direction of the mobile terminal 10 has been separated away from the lighting device 20a. Even in the above case, the lock (and, the selected state of the concerned operation target) of the operation target (lighting device 20a) is not cancelled. Therefore, a user can perform the operation with regard to the operation target stably and easily.

Here, a specific example of the lock start condition is described. For example, the lock start condition may be a condition based on the information regarding the posture of the mobile terminal 10. For example, the lock start condition is that the change amount of the posture of the mobile terminal 10 is within a predetermined threshold at a predetermined time from the time when the operation target has been selected.

Alternatively, the lock start condition may be a condition based on an operation instruction for an operation target. For example, the lock start condition is that a predetermined operation for a display screen is detected. As an example, the lock start condition may be that an arbitrary place within the display screen of the mobile terminal 10 is touched. Alternatively, in the case where a GUI button for a lock is displayed on the display screen, the lock start condition may be that the concerned GUI button is touched. Alternatively, the lock start condition may be that a predetermined touch gesture is made for the display screen. Here, the predetermined touch gesture may be, for example, that swiping is made in a predetermined direction, such as a horizontal direction or a vertical direction, on the display screen, may be that an arbitrary position on the display screen is pressed for a long time, or may be that the strength of a touch force for the display screen is strengthened more than a predetermined threshold.

Alternatively, the lock start condition may be that a predetermined operation is made for a region other than the display screen. For example, the lock start condition may be that a physical button, switch, or the like disposed on the mobile terminal 10 is operated, or, for example, may be that the outer peripheral section of the mobile terminal 10 is grasped strongly. Alternatively, the lock start condition may be that a predetermined sound is input by a user for the input section 124 (microphone).

Alternatively, the lock start condition may be that the mobile terminal 10 is set to a hold state. Alternatively, the lock start condition may be that, for example, the start of an operation for changing the values of parameters with regard to an operation target, such as the brightness of a light, is detected. In this connection, with regard to a case where the condition is used, before an operation target is locked, for example, a UI for changing the values of concerned parameters may be displayed beforehand on the display screen.

2-1-3-3. Cancellation of Lock

Moreover, after an operation target has been locked, in the case where the lock cancel condition has been satisfied, the lock control section 104 cancels the lock of the concerned operation target. In this connection, as mentioned later, in the case where the lock of the operation target has been cancelled, predetermined information may be output by the control of the output control section 106.

Time-Out

Here, the lock cancel condition may be that the cancel time elapses (time-out). For example, the lock cancel condition may be that a cancel time elapses from the time when an operation target has been locked, or, may be that a cancel time elapses from the time when an operation (using the mobile terminal 10) with regard to an operation target has been detected last. In this connection, the length of the cancel time may be determined beforehand.

Example of Decision of Length of Cancel Time

Alternatively, the length of the cancel time may be decided dynamically. For example, as the amount of operation performed by a user for the mobile terminal 10 per unit time is larger, the length of the cancel time may be set to be longer. Alternatively, as the contents of operation performed by a user is more complicated, the length of the cancel time may be set to be longer.

Alternatively, the length of the cancel time may be decided to be a length corresponding to the type of a device 20 of an operation target. As an example, as the time necessary for a user to operate a device 20 becomes longer, the length of the cancel time for such a device 20 may be decided to be longer. Generally, the types of the operation with regard to a light are an input of ON or OFF, adjustment of brightness, and the like, and the time necessary for the operation is short. On the other hand, the types of the operation with regard to a set-top box equipped with a recording function are many, and the contents of the operation are also complicated. Accordingly, the time necessary for the operation is longer. Then, the cancel time with regard to the set-top box equipped with a recording function may be decided to be longer than the cancel time with regard to the light.

Alternatively, for example, the time necessary for a user to acknowledge, such as, to confirm an operation result for a device 20, becomes longer, the length of the cancel time for such a device 20 may be decided to be longer. Generally, a user can confirm a change of the brightness of a light in an instant. On the other hand, a certain time may be needed to confirm the contents of a television channel. Then, the cancel time with regard to a television receiver may be decided to be longer than the cancel time with regard to the light.

Alternatively, the length of the cancel time may be decided according to a time zone or the day of the week. For example, in the average time zone during which a user goes to bed or in the average time zone during which a user commutes to work or goes to school, the length of the cancel time can be decided to be shorter (than the daytime). Alternatively, the length of the cancel time in a weekday can be decided to become short than that in a holiday.

Alternatively, the length of the cancel time may be dynamically decided depending on whether a specific operation is made for the mobile terminal 10. For example, in the case where a specific operation has been made for the mobile terminal 10, the length of the cancel time can be decided to become shorter than the standard. Here, the specific operation may be that, for example, the indicating direction of the mobile terminal 10 is explicitly directed to the direction of another device 20b different from the device 20a of an (current) operation target. In this connection, the determining method for that the indicating direction of the mobile terminal 10 is changed explicitly, may be determined, for example, on the basis of the measurement result for the degree of abruptness of a change in the posture of the mobile terminal 10 by the measurement sections 122 (acceleration sensor etc.). According to the above determining method, it becomes possible to distinguish between a case where a user explicitly has made the mobile terminal 10 face in the direction of another device 20b different from the device 20a of the (current) operation target and a case where the posture of the mobile terminal 10 has shifted without the intention of a user.

Modified Example

By the way, with regard to the method of shortening the cancel time on the basis of an explicit change of the indicating direction of the mobile terminal 10 as mentioned above, it is desirable to take into consideration the degree of denseness of the devices 20 located in the vicinity of the concerned operation target. For example, in the case where the degree of denseness is large, the distance between the devices 20 is small. Accordingly, according to the above-mentioned method, with only a small change of the direction of the mobile terminal 10, another device 20b is indicated, which results in that the length of the cancel time becomes to be set to be short. For this reason, due to a timeout shorter than the time that a user expects, the possibility that the operation target shifts to other devices 20 becomes high. As a result, it may lead to an erroneous operation. Then, as a modified example, the length of the cancel time may be decided dynamically further accordingly to the degree of denseness of the devices 20. For example, as the degree of denseness of the devices 20 in the vicinity of an operation target selected by the operation target selecting section 102, is higher, the length of the cancel time can be decided to become longer. According to the above decision example, it becomes possible to suppress an operation target from shifting to other devices 20 without the intention of a user.

Operation Instruction for Operation Target

Alternatively, the lock cancel condition may be a condition based on an operation instruction for an operation target. For example, the lock cancel condition is that a predetermined operation for a display screen is detected. As an example, the lock cancel condition may be that an arbitrary place within the display screen of the mobile terminal 10 is touched. Alternatively, in the case where a GUI button for lock cancel is displayed on the display screen, the lock cancel condition may be that the concerned GUI button is touched. Alternatively, the lock cancel condition may be that a predetermined touch gesture is made for the display screen. Here, the predetermined touch gesture may be, for example, that swiping is made in a predetermined direction, such as a horizontal direction or a vertical direction, on the display screen, may be that an arbitrary position on the display screen is pressed for a long time, or may be that the strength of a touch force for the display screen is strengthened more than a predetermined threshold.

Alternatively, the lock cancel condition may be that a predetermined operation is made for a region other than the display screen. For example, the lock cancel condition may be that the mobile terminal 10 is swung. Alternatively, the lock cancel condition may be that a physical button, switch, or the like disposed on the mobile terminal 10 is operated, or, for example, may be that the outer peripheral section of the mobile terminal 10 is grasped strongly. Alternatively, the lock cancel condition may be that a predetermined sound is input by a user for the input section 124 (microphone).

Fact that Mobile Terminal 10 is Placed

Alternatively, the lock cancel condition may be that the fact that the mobile terminal 10 is placed on an object under stillness, for example, such as a desk, a floor, etc., is detected. In this regard, the fact that the mobile terminal 10 has been placed on an object under stillness, may be determined, for example, on the basis of the matter that it is measured by the measurement section 122 that the acceleration or posture of the mobile terminal 10 almost does not change for a predetermined time.

Posture of Mobile Terminal 10

Alternatively, the lock cancel condition may be that the fact that the indicating direction of the mobile terminal 10 has changed to a predetermined direction, is detected. For example, it may be that the mobile terminal 10 is made to face in a predetermined direction (for example, downward in the vertical direction etc.) determined beforehand for cancelling a lock. Alternatively, it may be that the mobile terminal 10 is made to face in the direction of a space determined beforehand in the room 2 for cancelling a lock, or, it may be that the mobile terminal 10 is made to shift into the concerned space.

Sensing Result of Face of User

Alternatively, the lock cancel condition may be that a state where the face of the corresponding user is not photographed by an in-camera built in the mobile terminal 10, is continued for a predetermined period.

2-1-3-4. Combination of Lock Start Condition and Lock Cancel Condition

In this regard, for a combination of the above-mentioned lock start condition and lock cancel condition, an arbitrary combination may be applied. For example, the lock start condition may be a touch for the display screen, and the lock cancel condition may be that the cancel time elapses (timeout). Alternatively, both the lock start condition and the lock cancel condition may be a touch for the display screen. Alternatively, the lock start condition may be a touch for the display screen, and the lock cancel condition may be that the mobile terminal 10 is swung.

Alternatively, the lock start condition may be that swiping is performed from the back to the front on the display screen, and the lock cancel condition may be that swiping is performed from the front to the back on the display screen. According to the above example, an operation target is locked by an operation like "pulling in" the operation target on the display screen, and the lock of the operation target is cancelled by an operation like "returning" the operation target on the display screen. Therefore, since the operation for locking an operation target and the operation for cancelling the lock of an operation target match a user's physical feeling, a user can perform the operation intuitively.

Alternatively, both the lock start condition and the lock cancel condition may be the matter that predetermined physical keys included in the mobile terminal 10 are depressed. In this connection, in particular, the above condition may be used in the case where the mobile terminal 10 is a remote controller.

2-1-3-5. Modified Example

Incidentally, in the above-mentioned description, the description has been given for the case where the lock start condition and the lock cancel condition are the same regardless of the type of the device 20. However, without being limited to such an example, they may be different depending on the type of the device 20. For example, in the case where the device 20 is a light, the lock cancel condition is a timeout, and in the case where the device 20 is a television receiver, the lock cancel condition may be that a predetermined operation for a display screen is detected. According to the above decision example, with regard to the light, a user can cancel the lock of an operation target (light) without performing an explicit operation. For example, eve in the case of going out or going to bed without performing an explicit operation, since the lock of the operation target can be cancelled, a user's convenience becomes high.

Moreover, with regard to the television receiver, it is desirable to constitute that, further, an operation screen includes a GUI button for cancelling a lock together with a UI for selecting a channel. With this, after having selected a desired channel, by touching the GUI button for cancelling on the same screen, a user can cancel the lock of an operation target (television receiver). Therefore, convenience is high, and the lock can be cancelled by a natural flow.

2-1-4. Output Control Section 106

The output control section 106 controls the output of information for the output section 126. For example, on the basis of the matter that an operation target has been selected by the operation target selecting section 102, and/or, the matter that the selection of the operation target has been cancelled, the output control section 106 makes, for example, the output section 126 display a UI, such as a predetermined icon, the output section 126 output sound, such as a predetermined effect sound, or the output sections 126 (vibrator etc.) vibrate with a predetermined vibration pattern. Moreover, on the basis of the matter that an operation target has been selected, it is also possible for the output control section 106 to make the output section 126 display an operation screen for operating the device 20 of the concerned operation target. Moreover, on the basis of the matter that the selection of the operation target has been cancelled, it is also possible for the output control section 106 to make the displayed operation screen to be not displayed, or, to switch over to the other screen.

Moreover, on the basis of the matter that an operation target has been locked by the lock control section 104, and/or, the matter that the lock of the operation target has been cancelled, the output control section 106 makes, for example, the output section 126 display a UI, such as a predetermined icon, the output section 126 output sound, such as a predetermined effect sound, or the output sections 126 (vibrator etc.) vibrate with a predetermined vibration pattern.

2-1-4-1. Control of Display Correspondingly to Operation Target

Moreover, the output control section 106 can also change a UI to be displayed correspondingly to the type of an operation target selected by the operation target selecting section 102. For example, in the case where the selected operation target is the lighting device 20a, the output control section 106 makes the output section 126 display a UI for the lighting device 20a, and, in the case where the selected operation target is the television receiver 20d, the output control section 106 makes the output section 126 display a UI for the television receiver 20d. Furthermore, the output control section 106 can also change a UI to be displayed correspondingly to the switch-over of the selection of an operation target. For example, in the case where the selection of the operation target has been switched over from the lighting device 20a to the television receiver 20d, the output control section 106 changes the UI to be displayed from the UI for the lighting device 20a to the UI for the television receiver 20d.

Moreover, the output control section 106 can also change the UI to be displayed correspondingly to the situation of the selected operation target. For example, in the case where the lighting apparatus 20a and the television receiver 20d have been correlated with each other (on the basis of a user's predetermined operation etc.), when the lighting device 20a is selected as an operation target, the output control section 106 may display simultaneously the UI for the lighting device 20a and the UI for the television receiver 20d. Alternatively, in the case where the light is set as a cooperation mode, for example, when the bracket light has been selected as an operation target, the output control section 106 may makes the UIs with regard to all or a part of lights arranged in the room 2, displayed simultaneously (for example, the UI for the bracket lights, the UI for the table light, the UI for the bulb-speaker 20h, etc.).

2-1-4-2. Control of Display with Regard to Cancel Time

Moreover, in the case where the matter that the cancel time elapses (timeout), is decided as the lock cancel condition, the output control section 106 can also makes the output section 126 and/or the corresponding operation target further display an indication showing the progress until the cancel time. For example, the output control section 106 counts down the displayed number with the passage of time, and, controls the indication such that, when the number has become, for example, "0", the lock of the corresponding operation target is cancelled. Alternatively, the output control section 106 extends a displayed bar correspondingly to the passage of time, and, controls an indication such that, when the bar has been extended to a predetermined range, for example, to an end of the displayed screen, the lock of the corresponding operation target is cancelled.

2-1-4-3. Control of Output for Detection of Posture or Position

Moreover, for example, for the purpose of detecting the posture or position of the mobile terminal 10, the output control section 106 can make the output section 126 output a predetermined sound.

2-1-5. Device Control Section 108

The device control section 108 is an example of a parameter value changing section in the present disclosure. While an operation target is locked, for example, the device control section 108 performs control with regard to the concerned operation target on the basis of an input for the input section 124. For example, the device control section 108 performs control for changing the values of parameters with regard to the operation target, for example, such as ON/OFF of a power source, illuminance, sound volume, or temperature of the operation target, on the basis of a user's input for the input section 124. As an example, in the case where an operation for changing the values of the parameters with regard to an operation target has been made on the display screen, the device control section 108 makes the communication section 120 transmit control signals corresponding to operation contents to the device 20 of the operation target.

2-1-6. Communication Section 120

The communication section 120 transmits and receives information with the other device capable of communicating with the mobile terminal 10. For example, the communication section 120 transmits control signals to the device 20 of the locked operation target in accordance with the control of the device control section 108. Moreover, the communication section 120 receives measurement results from various types of sensors, such as an environmental camera arranged in the room 2. Alternatively, the communication section 120 receives, from the server 30, the position information of each of the devices 20 in the room 2, or information with regard to the point cloud of the room 2 constituted by the server 30.

2-1-7. Measurement Section 122

The measurement section 122 measures various kinds of information with regard to the mobile terminal 10. For example, the measurement section 122 may include a tri-axial acceleration sensor, a gyro sensor, a geomagnetic sensor, and an image sensor (camera). Furthermore, the measurement section 122 may also include, for example, a positioning device such as a GPS receiver, a depth sensor, and so on.

For example, the measurement section 122 can measure the posture and position of the mobile terminal 10. Moreover, the measurement section 122 photographs the image of the outside environment, and, can record as a digital image.

2-1-8. Input Section 124

The input section 124 receives various kinds of inputs by a user. In this connection, in the case where a display section (not shown) included in the output section 126 includes a touch display, the input section 124 and the display section may be constituted integrally in one body. Furthermore, in the above case, it is possible for the input section 124 to detect a touch operation for a display screen.

2-1-9. Output Section 126

The output section 126 has a display section including, for example, an LCD (Liquid Crystal Display), an OLED (Organic Light Emitting Diode), and so on. Moreover, the output section 126 has a voice output section. For example, in accordance with the control of the output control section 106, the output section 126 displays an operation screen, or outputs a sound.

2-1-10. Storage Section 128

The storage section 128 memorizes various kinds of data and various kinds of software. For example, the storage section 128 memorizes the information as to whether any one of the devices 20 is locked, and in the case where any one of the devices 20 is locked, the storage section 128 memorizes the identification information of the concerned device 20. Moreover, the storage section 128 memorizes the application for operating the devices 20 of a plurality of types arranged in the room 2.

<2-2. Example of UI>

In the above, the constitution according to the present embodiment has been described. Next, an example of the UI according to the present embodiment is described with reference to FIGS. 6A, 6B, 7A, 7B, 8A, 8B, 9A, and 9B. It should be noted that the example of the UI mentioned below is merely an example. Accordingly, without being limited to such an example, the other UI can be also displayed.

Moreover, in the following description, the description is given on the assumption that, in the initial state, none of the devices 20 is locked.

2-2-1. Selection of Operation Target

Figure 6B:
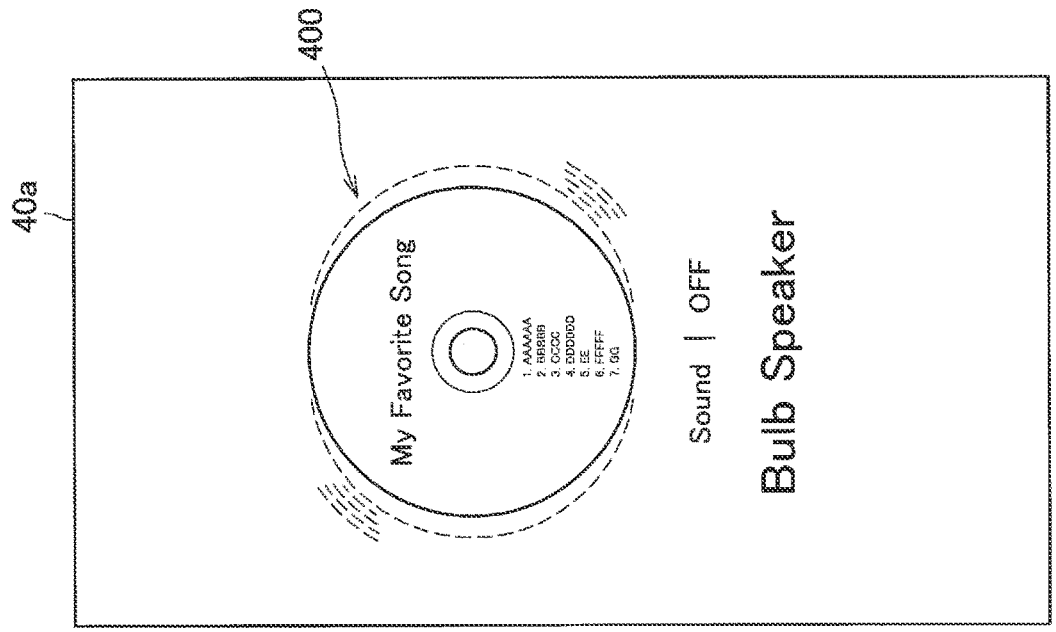
FIGS. 6A and 6B are explanatory illustrations showing a UI example according to the same embodiment.
Figure 6A:
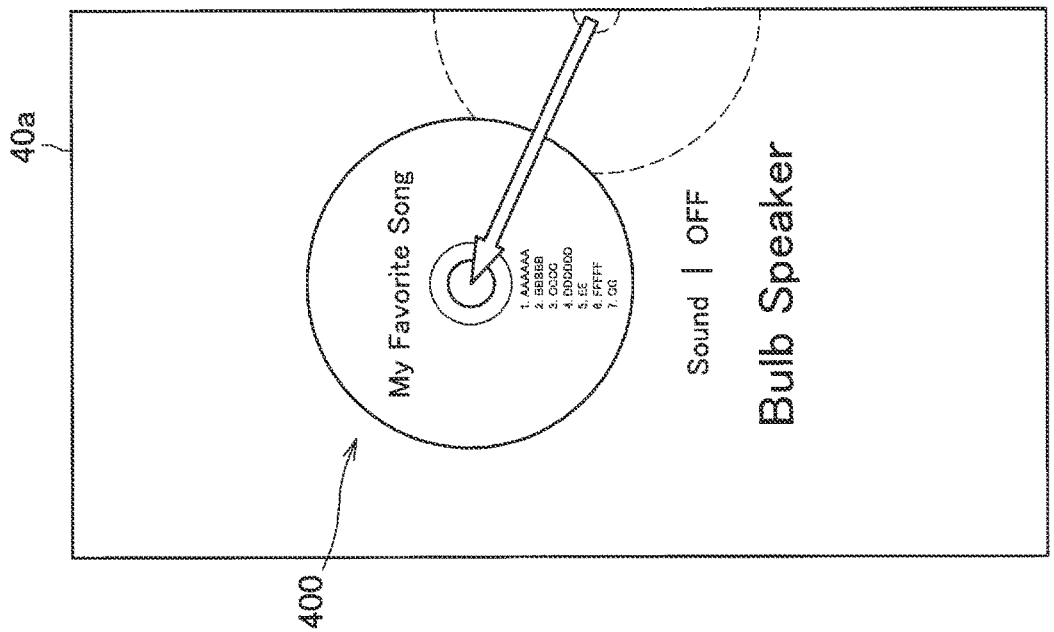

First, the operation target selecting section 102 selects one of the plurality of devices 20 (here, it is assumed as the bulb speaker 20h) from the plurality of devices 20 arranged in the room 2 on the basis of the direction indicated by the mobile terminal 10. Then, the output control section 106 makes the output section 126 display the operation screen 40a with regard to the selected device 20. This operation screen 40a includes a predetermined UI 400, and the UI 400 may be displayed on a position different from the position at the time of locking an operation target. For example, as shown in FIG. 6A, the output control section 106 makes the U1400 displayed at the right end of the operation screen 40a. However, without being limited to the above example, the UI 400 may be displayed, for example, on the same position at the time of locking an operation target, such as the center of the operation screen 40a. Moreover, in the case where the UI 400 is displayed on the same position as the time of locking the operation target, the UI 400 may be displayed in a display mode different from that at the time of locking the operation target, for example, such as being displayed by blinking.

Thereafter, as shown with an arrow mark in FIG. 6A, for example, in the case where a user performs swiping so as to shift the UI 400 from the right end to the center on the operation screen 40a, the operation target selecting section 102 selects the bulb speaker 20h as an operation target. Then, the lock control section 104 sets the bulb speaker 20h to a lockable state. At this time, as shown in FIG. 6B, the output control section 106 displays an animation in which, for example, the UI 400 vibrates vertically and horizontally, on the operation screen 40a. With this, a user can know that the bulb speaker 20h is set to a lockable state.

2-2-2. Lock of Operation Target

Figure 7B:
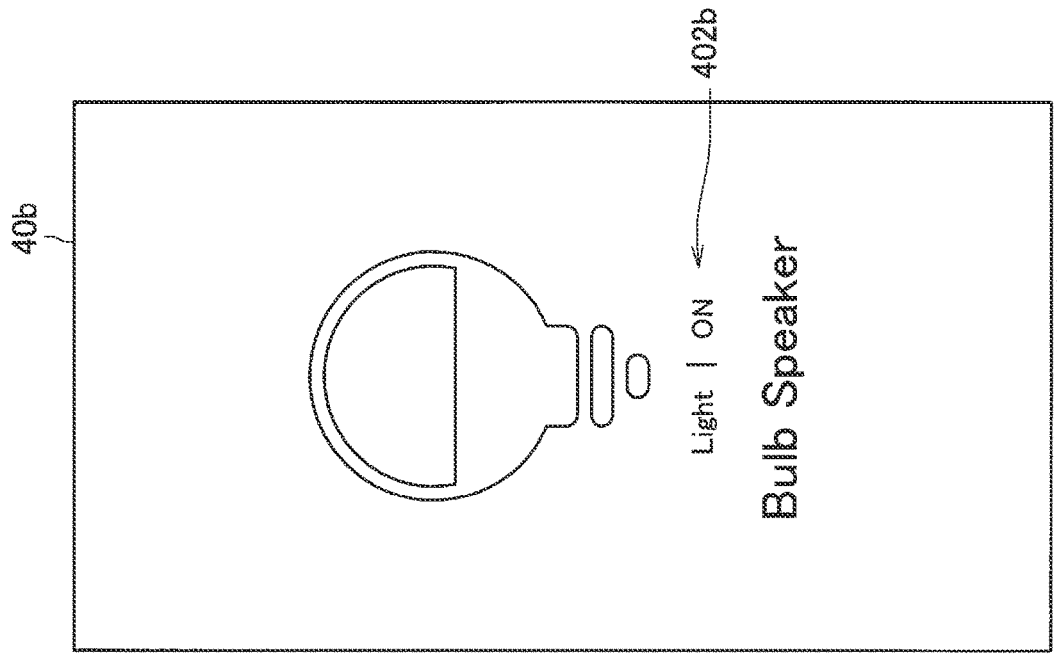
FIGS. 7A and 7B are explanatory illustrations showing a UI example according to the same embodiment.
Figure 7A:
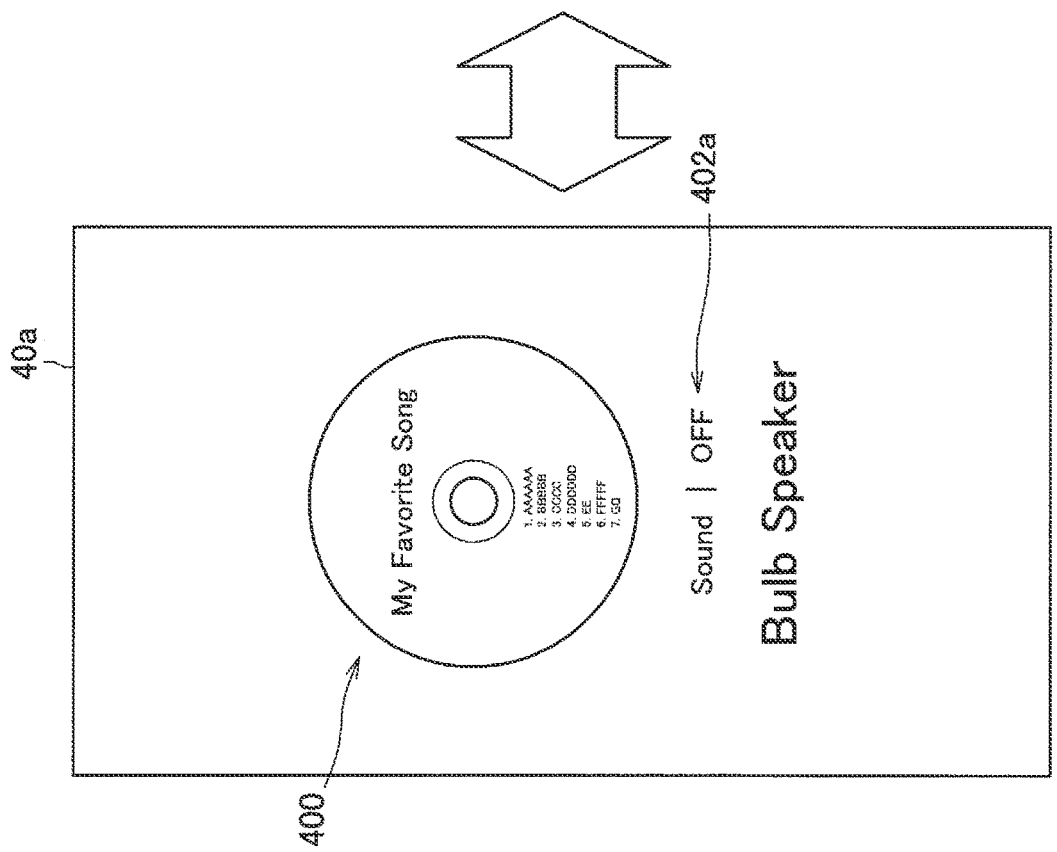

Thereafter, for example, in the case where an arbitrary place on the operation screen 40a is pressed for a long time, or a GUI button (not shown) for lock/unlock displayed on the operation screen 40a is touched, the lock control section 104 locks an operation target (bulb speaker 20h). Then, the output control section 106 renews the indication on the operation screen 40a as shown in FIG. 7A. In this connection, in the operation screen 40a shown in FIG. 7A, a user can adjust the values of the parameters (here, "sound") with regard to the bulb speaker 20h. Moreover, FIG. 7A shows a state where the output of sound with regard to the bulb speaker 20h is set to "OFF".

2-2-3. Adjustment of Parameter

In the example shown in FIG. 7A, in the case where a sound adjustment UI 402a being displayed on the operation screen 40a is, for example, touched by a user, the device control section 108 switches over the output of the sound with regard to the bulb speaker 20h from "OFF" to "ON", or switches over from "OFF" to "sound volume level 1". Moreover, in the case where an arbitrary place on the operation screen 40a is tapped, as shown in FIG. 7B, the output control section 106 switches over the operation screen 40a, and, displays an operation screen 40b for adjusting the value of another parameter (here, "brightness") with regard to the bulb speaker 20h. In this connection, FIG. 7B shows a state where the light of the bulb speaker 20h is set to "ON". Then, in the case where a brightness adjustment UI 402b being displayed on the operation screen 40b is, for example, touched by a user, the device control section 108 switches over the output of the light of th bulb speaker 20h from "ON" to "OFF" (i.e., a light is turned off).

Incidentally, in the above-mentioned description, the description has been given for the case where, by touching the sound adjustment UI 402a or the brightness adjustment UI 402b, the sound volume or the brightness of the light of the bulb speaker 20h is adjusted. However, it is not limited to such an example. For example, the sound volume or the brightness of the light may be continuously adjusted by a touch gesture, such as a drag operation.

Moreover, in the case where an arbitrary place on the operation screen 40b shown in FIG. 7B is tapped, the output control section 106 can switch over the operation screen 40b, and, displays again the operation screen 40a shown in FIG. 7A.

2-2-4. Switch-Over of Operation Target

Moreover, when the operation screen 40a (or, the operation screen 40b) shown in FIGS. 7A and 7B is being displayed, in the case where swiping is performed, for example, from the left to the right (hereafter, referred to as a regular feed direction) for the operation screen 40, the lock control section 104 determines that the lock cancel condition has been satisfied, and, cancels the lock of the bulb speaker 20h. In this regard, at this time, as shown in FIG. 6B, the output control section 106 may display an animation in which the UI 400 vibrates vertically and horizontally on the operation screen 40.

Successively, the operation target selecting section 102 selects another device 20 (here, it is assumed as a portable projector) as an operation target from the plurality of devices 20 on the basis of, for example, the direction indicated by the mobile terminal 10. Then, the lock control section 104 locks the operation target (portable projector). Then, as shown in FIGS. 8A and 8B, the output control section 106 switches over the operation screen 40a, and, displays the operation screen 40c shown in FIG. 8B. This operation screen 40c is an operation screen for adjusting the values of the parameters (here, "screen") with regard to the portable projector.

In this connection, in the case where the swiping is further performed on the operation screen 40c in the regular feed direction, the lock control section 104 cancels the lock of the operation target (portable projector). Then, it becomes possible for the operation target selecting section 102 to further select a device 20 of another type as an operation target.

Moreover, in the case where the swiping is performed in a direction opposite to the regular feed direction on the operation screen 40c, the lock control section 104 cancels the lock of the operation target (portable projector), and it becomes possible for the operation target selecting section 102 to select the bulb speaker 20h as an operation target again. Then, the output control section 106 can display again the operation screen 40a as shown in FIG. 8A.

2-2-5. Switch-Over of Type of Operation Screen

Figure 9B:
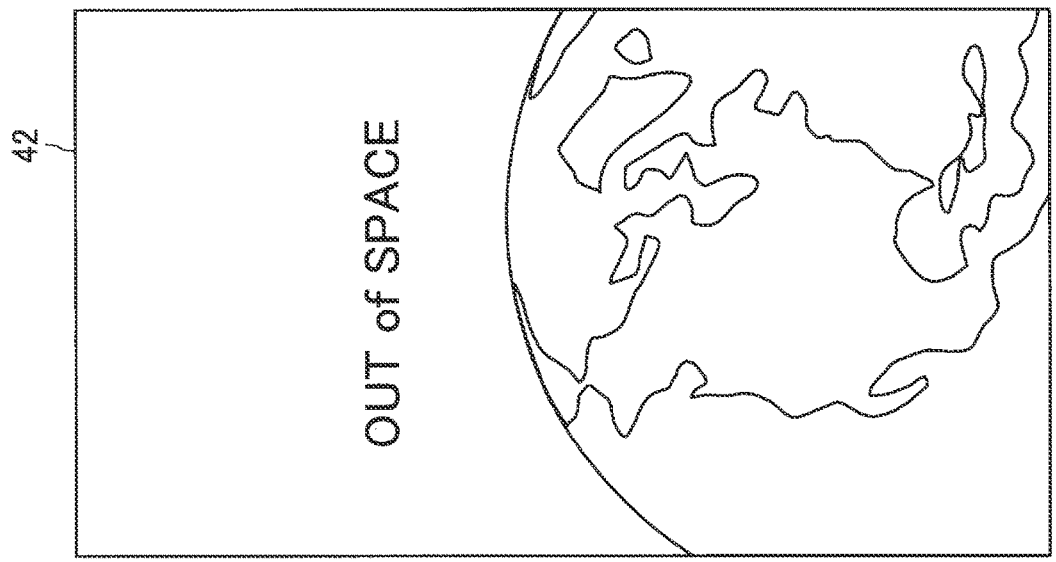
FIGS. 9A and 9B are explanatory illustrations showing a UI example according to the same embodiment.
Figure 9A:
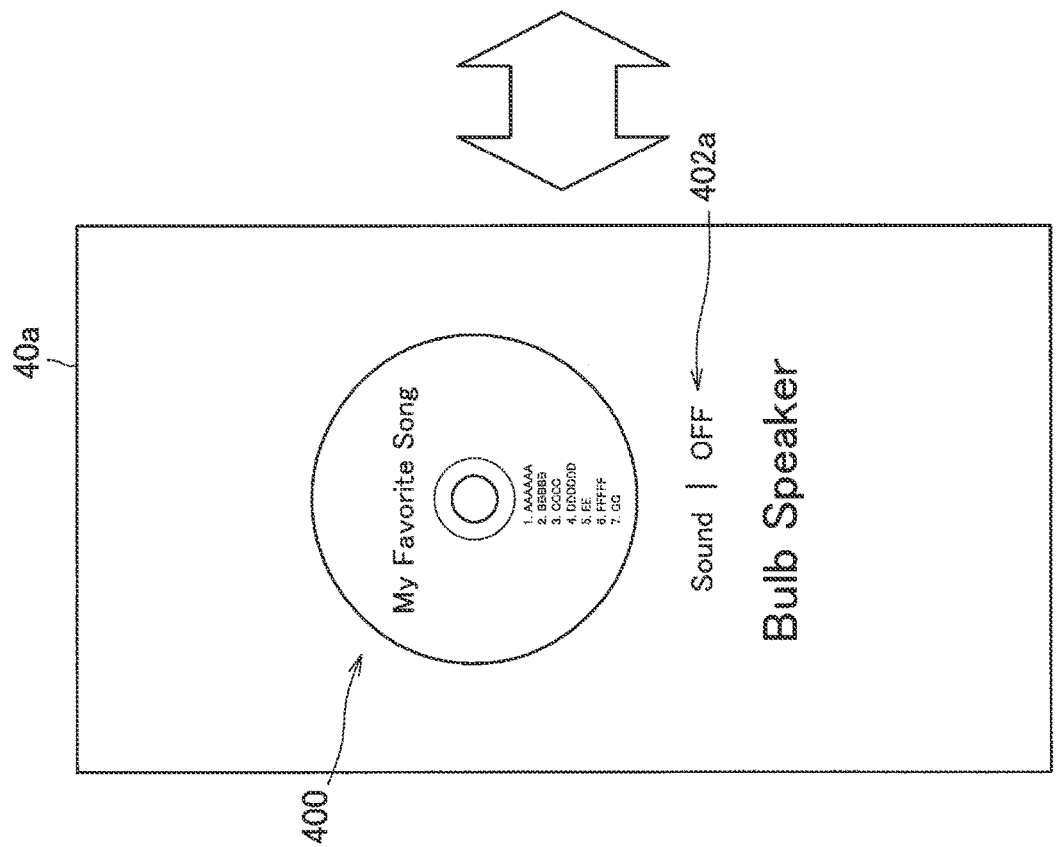

Moreover, when the operation screen 40a to the operation screen 40c shown in FIGS. 7A, 7B, 8A, and 8B is being displayed, in the case where swiping is performed, for example, from the bottom to the top for the operation screen 40, the output control section 106 can also switch over the operation screen 40, and, displays the operation screen 42 of another type as shown in FIG. 9B. This operation screen 42 may be, for example, an operation screen of a higher hierarchical level than the operation screen 40a to the operation screen 40 c. Moreover, when the operation screen 42 is being displayed, in the case where swiping is made from the top to the bottom for the operation screen 42, the output control section 106 can switch over the operation screen 42, and, displays the original operation screen 40 again.

2-2-6. Modified Example

It should be noted that the example of the UI according to the present embodiment is not limited to the above-mentioned example. For example, the operation screen 40a shown in FIG. 6A may not be displayed. That is, when an operation target has been selected by the operation target selecting section 102, the output control section 106 may display the operation screen 40a shown in FIG. 6B (as the first operation screen 40).

<2-3. Operation>

Figure 10:
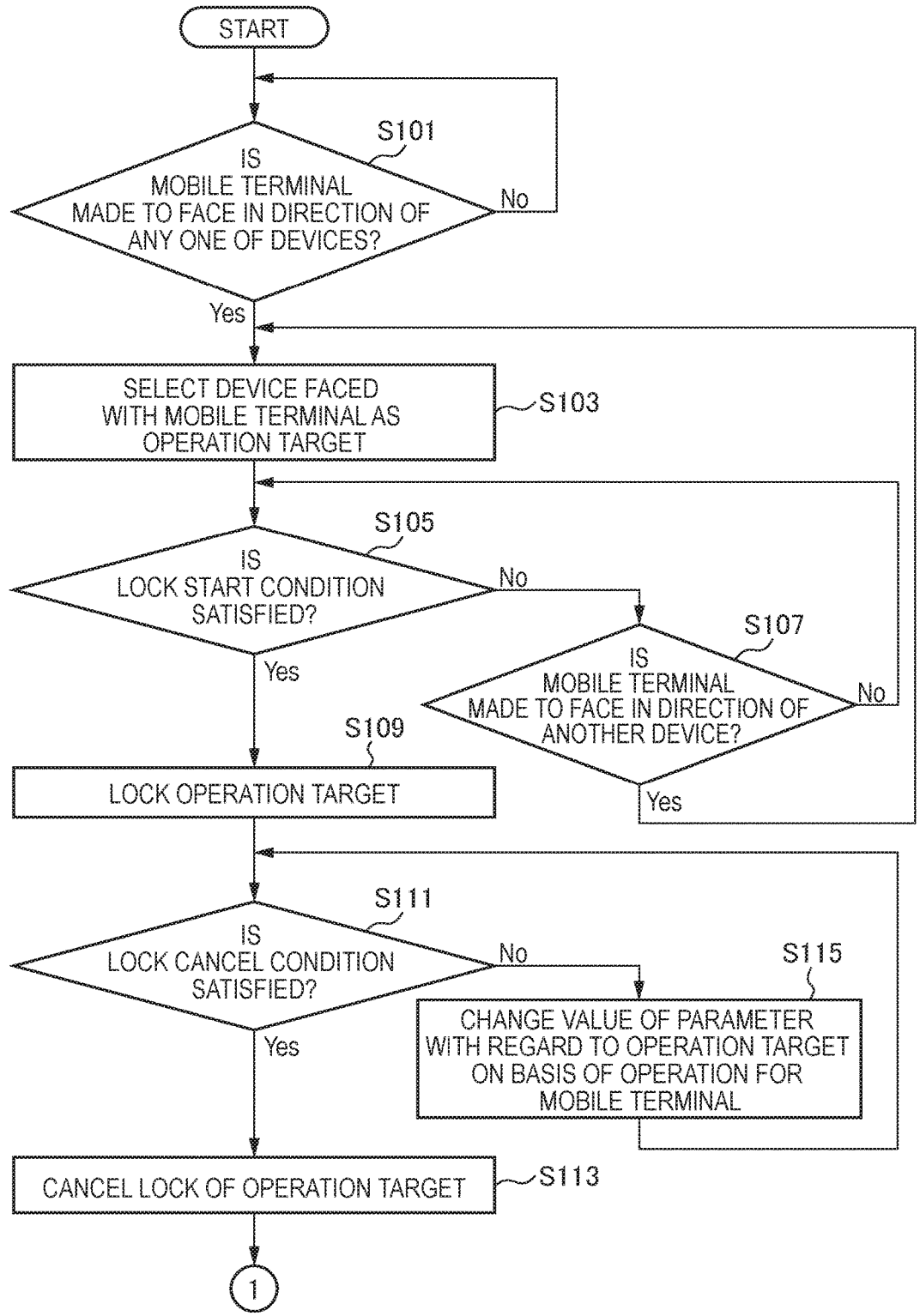
FIG. 10 is a flowchart showing a part of an operation example according to the same embodiment.
Figure 11:
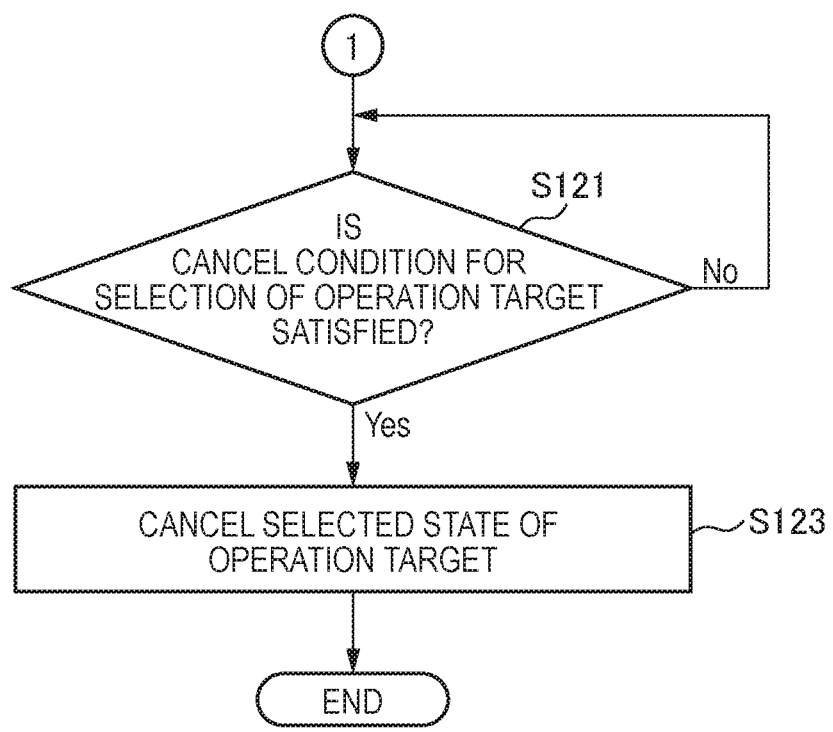
FIG. 11 is a flowchart showing a part of an operation example according to the same embodiment.

Next, an example of operation according to the present embodiment is described with reference to FIG. 10 and FIG. 11. FIG. 10 and FIG. 11 are a flow chart showing an example of operation according to the present embodiment. In this connection, in FIG. 10, it is premised that, in the initial state, the mobile terminal 10 has not selected any one of the devices 20 (as an operation target).

As shown in FIG. 10, first, the operation target selecting section 102 determines, for example, whether the indicating direction of the mobile terminal 10 is directed to any one of the plurality of devices 20 located in the room 2 (S101). In the case where the indicating direction of the mobile terminal 10 is not directed to any one of the devices 20 (S101: No), the operation target selecting section 102 performs the processing in S101 again.

On the other hand, in the case where the indicating direction of the mobile terminal 10 is directed to any one of the devices 20 (S101: Yes), the operation target selecting section 102 selects the corresponding device 20 as an operation target. Then, the lock control section 104 decides a condition for cancelling the selected state of the selected operation target on the basis of a predetermined determination criterion (S103).

Successively, the lock control section 104 determines whether the lock start condition is satisfied (S105). In the case where the lock start condition is not satisfied (S105: No), the lock control section 104 determines whether the indicating direction of the mobile terminal 10 is directed to another device 20 different from the operation target selected in S103 (S107). In the case where the indicating direction of the mobile terminal 10 is not directed to another device 20 (S107: No), the lock control section 104 performs the processing in S105 again. On the other hand, in the case where the indicating direction of the mobile terminal 10 is directed to another device 20 (S107: Yes), the mobile terminal 10 performs the processing in S103 again.

In S105, in the case where the lock start condition has been satisfied (S105: Yes), the lock control section 104 locks the operation target selected in S103 (S109).

Successively, the lock control section 104 determines whether the lock cancel condition has been satisfied (S111). In the case where the lock cancel condition is not satisfied (S111: No), the device control section 108, for example, performs control for changing the values of the parameters with regard to the concerned operation target on the basis of a user's input for the input section 124 (S115). Then, the mobile terminal 10 performs the processing in S111 again.

On the other hand, in the case where the lock cancel condition has been satisfied (S111: Yes), the lock control section 104 cancels the lock of the operation target (S113).

Here, the operation after S113 is described with reference to FIG. 11. As shown in FIG. 11, after S113, the operation target selecting section 102 determines whether a condition for cancelling the selected state of the concerned operation target decided in S103 has been satisfied (S121). In the case where the condition for cancelling the selected state of the concerned operation target is not satisfied (S121: No), the operation target selecting section 102 performs the processing in S121 again.

On the other hand, in the case where the condition for cancelling the selected state of the concerned operation target has been satisfied (S121: Yes), the operation target selecting section 102 cancels the selected state of the concerned operation target (S123). Then, the above operation is ended.

2-3-1. Modified Example

It should be noted that the operation according to the present embodiment is not limited to the above-mentioned example. For example, the mobile terminal 10 can also performs the processing in S101 again after S123.

<2-4. Effect>

2-4-1. Effect 1

As described in the above, the mobile terminal 10 according to the present embodiment selects an operation target from the plurality of devices 20 on the basis of the detection of the posture of the mobile terminal 10, and in the case where the lock start condition has been satisfied, the concerned operation target is locked. For this reason, the convenience at the time of the operation with regard to an operation target can be improved.

For example, after an operation target has been locked until a lock cancel condition is satisfied, the mobile terminal 10 does not cancel the lock (and, the selected state of the concerned operation target) of the operation target. For this reason, for example, even in the case where a user's hand moves unintentionally during the operation for the mobile terminal 10, and the direction of the mobile terminal 10 separates away from the corresponding operation target, the lock of the operation target is not cancelled. Therefore, a user can perform operation with regard to the concerned operation target stably and easily.

2-4-2. Effect 2

Moreover, in the case of having selected an operation target, the mobile terminal 10 optimally decides a condition for cancelling the selected state of the concerned operation target on the basis of a predetermined determination criterion. With this, a user can perform easily operation with regard to a plurality of devices 20 using one mobile terminal 10. For example, the cancellation of the selection of an operation target and the switch-over of the device 20 of an operation target can be performed easily. Moreover, since it is possible to prevent the device 20 of an operation target from being switched over without the intention of a user, it leads to prevention of erroneous operation.

3. Hardware Constitution

Figure 12:
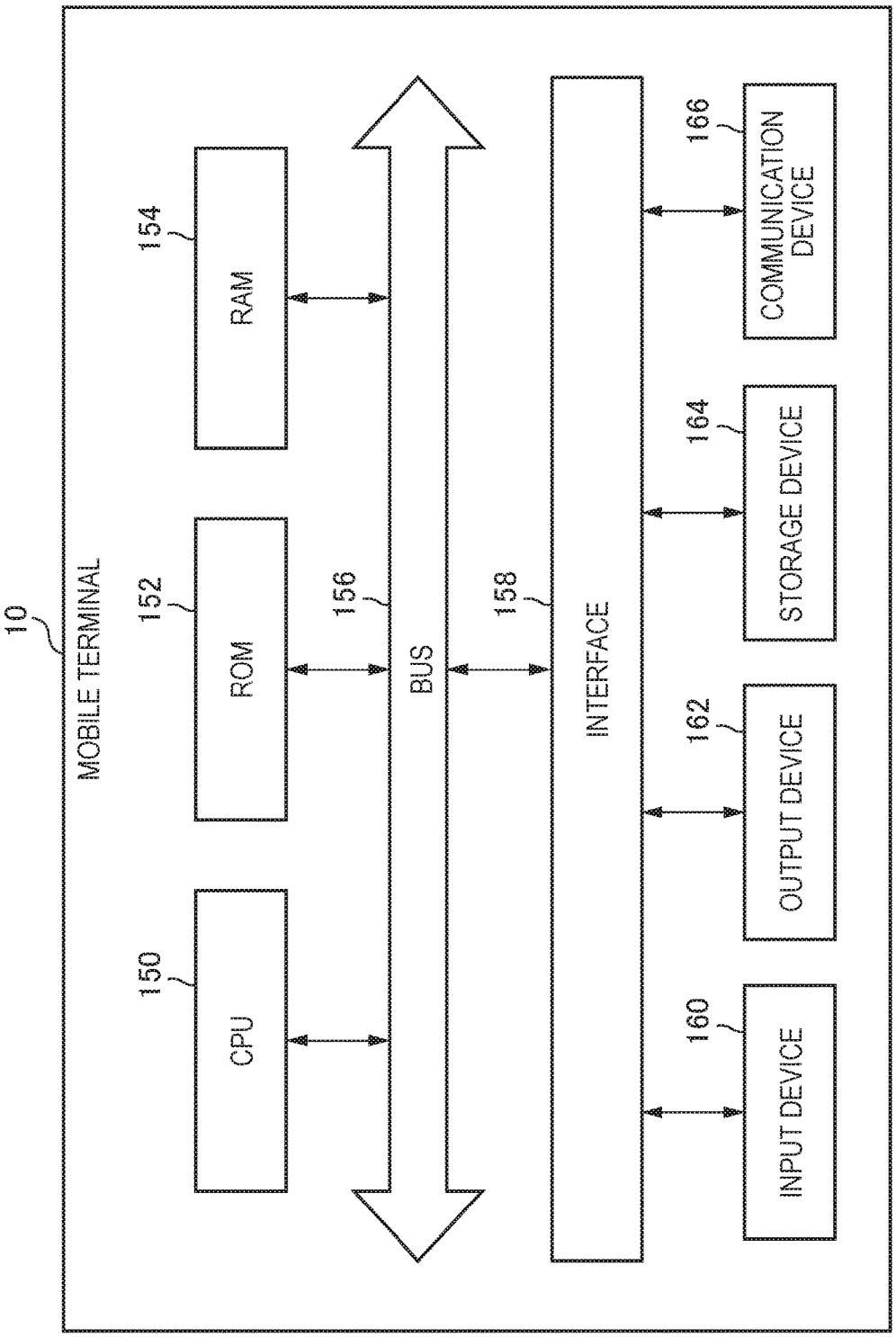
FIG. 12 is an explanatory illustration showing a hardware constitution example of a mobile terminal 10 according to the same embodiment.

Next, a hardware constitution of the mobile terminal 10 according to the present embodiment is described with reference to FIG. 12. As shown in FIG. 12, the mobile terminal 10 includes a CPU 150, a ROM (Read Only Memory) 152, a RAM 154, a bus 156, an interface 158, an input device 160, an output device 162, a storage device 164, and a communication device 166.

The CPU 150 functions as an arithmetic processing device and a control device, and, controls the overall operation in the mobile terminal 10 in accordance with various programs. Moreover, the CPU 150 realizes the function of the control section 100 in the mobile terminal 10. In this connection, the CPU 150 includes a processor, such as a microprocessor.

The ROM 152 memorizes programs used by the CPU 150 and control data such as arithmetic parameters and the like.

The RAM 154 memorizes temporarily, for example, programs executed by the CPU 150 and the like.

The bus 156 includes CPU buses and the like. This bus 156 mutually connects the CPU 150, the ROM 152, and the RAM 154.

The interface 158 connects the input device 160, the output device 162, the storage device 164, and the communication device 166 with the bus 156.

The input device 160 includes an input means to allow a user to input information, for example, such as a touch panel, a button, a switch, a dial, a lever, and a microphone; an input control circuit to produce input signals on the basis of an input by a user and to output to the CPU 150; and so on.

The output device 162 includes, for example, display devices, such as a liquid crystal display (LCD) device, an OLED device, and a lamp. Moreover, the output device 162 includes an audio output device, such as a speaker.

The storage device 164 is a device that functions as the storage section 128 and is used for storing data. The storage device 164 includes, for example, a storage medium, a recording device to record data in the storage medium, a read-out device to read out data from the storage medium, or a deleting device to delete data recorded in the storage medium.

The communication device 166 is, for example, a communication interface includes a communication device for connecting with a communication network 32 and the like. Moreover, the communication device 166 may be a wireless LAN-correspondence communication device, an LTE (Long Term Evolution)-correspondence communication device, or a wire communication device that performs communication through a cable. This communication device 166 functions as the communication section 120.

4. Modified Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modified Example 1

For example, in the above-mentioned embodiment, the description has been given for an example in which the operation target according to the present disclosure is the device 20. However, it is not limited to the above example. For example, the concerned operation target may be, for example, a display object, such as a window and an icon. That is, the mobile terminal 10 can select a display object located in the direction indicated by the mobile terminal 10 as an operation target from one or more display objects displayed on, for example, a display device (not shown) such as an LCD and an OLED, a television receiver 20d, and the like.

Alternatively, the concerned operation target may be virtual objects, such as AR (Augmented Reality) contents and the like. For example, in the case where the mobile terminal 10 is made to face a position or range where a virtual object is perceived by a user, the mobile terminal 10 can select the facing virtual object as an operation target.

4-2. Modified Example 2

Moreover, in the above-mentioned embodiment, the description has been given for the example where the information processing device and the object in the present disclosure are the mobile terminal 10. However, it is not limited to the above example. For example, the concerned information processing device and the concerned object may be different from each other. For example, the concerned information processing device is a smart phone, and the concerned object is a remote controller.

Alternatively, the concerned object may be, for example, the body of a user, such as a finger, an arm, a jaw, eyes, or the whole face. In this connection, in the case of the above modified example, the direction and position of the concerned object may be specified on the basis of, for example, a photographed image by an environmental camera installed inside the room 2. Moreover, in the case where the concerned object is eyes, the operation target selecting section 102 can select an operation target on the basis of the detection of the direction of the line of sight.

4-3. Modified Sample 3

Moreover, all the constitutional elements included in the above-mentioned control section 100 may be mounted on the server 30 instead of the mobile terminal 10. Then, in the above case, the information processing device in the present disclosure may become the server 30. In this connection, without being limited to the server 30, the concerned information processing device may be, for example, a device of other types capable of being connected to the communication network 32, such as PC, a game machine, and the like.

In addition, according to the above-described embodiments, it is also possible to create a computer program for causing hardware such as the CPU 501, ROM 502, and RAM 503 to execute functions equivalent to the respective structural elements of the mobile terminal 10 according to the above-described embodiments. Moreover, a recording medium recording the concerned computer program can be also provided.

Moreover, for example, the above-mentioned operation target selecting section 102 and lock control section 104 may be realized by a combination of one or two or more processors and one or two or more memories memorizing one or two or more control programs.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an operation target selecting section that cancels a selected state of a target selected as an operation target on a basis of detection of a posture of an object; and a lock control section that changes a condition for cancelling the selected state on a basis of a predetermined determination criterion.

(2)

The information processing device according to (1), in which the predetermined determination criterion includes information regarding a posture of the object.

(3)

The information processing device according to (2), in which the predetermined determination criterion includes a relationship between a direction indicated by the object and a position of the operation target.

(4)

The information processing device according to any one of (1) to (3), in which the predetermined determination criterion includes information with regard to the operation target.

(5)

The information processing device according to any one of (1) to (4), in which the predetermined determination criterion includes information regarding detection of an operation instruction for the operation target.

(6)

The information processing device according to any one of (1) to (5), in which the operation target selecting section selects the operation target further on a basis of detection of a posture of the object, and in a case where the operation target is selected, the operation target selecting section does not cancel the selected state until the condition for cancelling the selected state is satisfied.

(7)

The information processing device according to any one of (1) to (6), in which the condition for cancelling the selected state includes a condition that a cancel time elapses.

(8)

The information processing device according to (7), in which a length of the cancel time is decided in accordance with information regarding a posture of the object.

(9)

The information processing device according to (8), in which a length of the cancel time is decided in accordance with a degree of abruptness of a change of a detected posture of the object.

(10)

The information processing device according to any one of (7) to (9), in which a length of the cancel time is decided in accordance with information with regard to the operation target.

(11)

The information processing device according to any one of (1) to (10), in which the condition for cancelling the selected state includes a condition that an operation instruction for the operation target is detected.

(12)

The information processing device according to (11), in which the condition for cancelling the selected state includes a condition that a predetermined operation for the object is detected.

(13)

The information processing device according to (11) or (12), further including:

an output control section that makes a display section display an operation screen corresponding to the operation target, in which the condition for cancelling the selected state includes a condition that a predetermined touch operation for the operation screen is detected.

(14)

The information processing device according to (12) or (13), in which the predetermined operation for the object includes an operation to vibrate the object.

(15)

The information processing device according to any one of (1) to (14), in which the condition for cancelling the selected state includes a condition that it is detected that an indicating direction of the object has changed to a predetermined direction.

(16)

The information processing device according to any one of (1) to (15), further including:

a parameter value changing section that changes a value of a parameter with regard to the operation target on a basis of detection of an operation for the object.

(17)

The information processing device according to any one of (1) to (16), in which the object is the information processing device, and the operation target is an electronic device.

(18)

The information processing device according to any one of (1) to (17), in which the object is a mobile device, and the operation target is an electronic device.

(19)

An information processing method, including:

cancelling a selected state of a target selected as an operation target on a basis of detection of a posture of an object; and changing a condition for cancelling the selected state on a basis of a predetermined determination criterion by a processor.

(20)

A program that makes a computer function as:

an operation target selecting section that cancels a selected state of a target selected as an operation target on a basis of detection of a posture of an object; and a lock control section that changes a condition for cancelling the selected state on a basis of a predetermined determination criterion.

REFERENCE SIGNS LIST

10, 90 Mobile terminal
20 Device
30 Server
32 Communication network
100 Control Section
102 Operation target selecting section
104 Lock control section
106 Output control section
108 Device control section
120 Communication section
122 Measurement section
124 Input section
126 Output section
128 Storage section

The invention claimed is:

1. An information processing device, comprising:
   an operation target selecting section configured to cancel a selected state of a target selected as an operation target based on a detection of a posture of the information processing device; and
   a lock control section configured to determine a condition for the cancellation of the selected state based on a specific determination criterion,
   wherein the condition for cancellation of the selected state includes a condition that a specific time elapses from a time the target is selected as the operation target.

2. The information processing device according to claim 1, wherein the specific determination criterion includes information regarding the posture of the information processing device.

3. The information processing device according to claim 2, wherein the specific determination criterion includes a relationship between a direction indicated by the information processing device and a position of the operation target.

4. The information processing device according to claim 1, wherein the specific determination criterion includes information with regard to the operation target.

5. The information processing device according to claim 1, wherein the specific determination criterion includes information regarding detection of an operation instruction for the operation target.

6. The information processing device according to claim 1, wherein
   the operation target selecting section is further configured to select the operation target based on the detection of the posture of the information processing device, and
   in a case where the operation target is selected, the operation target selecting section is configured to not cancel the selected state until the condition for the cancellation of the selected state is satisfied.

7. The information processing device according to claim 1, wherein a length of the specific time is determined in accordance with information regarding the posture of the information processing device.

8. The information processing device according to claim 7, wherein the length of the specific time is determined in accordance with a degree of abruptness of a change of the detected posture of the information processing device.

9. The information processing device according to claim 1, wherein a length of the specific time is determined in accordance with information with regard to the operation target.

10. The information processing device according to claim 1, wherein the condition for the cancellation of the selected state further includes a condition that an operation instruction for the operation target is detected.

11. The information processing device according to claim 10, wherein the condition for the cancellation of the selected state further includes a condition that a determined operation for the information processing device is detected.

12. The information processing device according to claim 10, further comprising:
    an output control section configured to control a display section to display an operation screen corresponding to the operation target,
    wherein the condition for the cancellation of the selected state further includes a condition that a determined touch operation for the operation screen is detected.

13. The information processing device according to claim 11, wherein the determined operation for the information processing device includes an operation to vibrate the information processing device.

14. The information processing device according to claim 1, wherein the condition for the cancellation of the selected state further includes a condition that an indicating direction of the information processing device has changed to a determined direction.

15. The information processing device according to claim 1, further comprising:
    a parameter value changing section configured to change a value of a parameter with regard to the operation target based on a detection of an operation for the information processing device.

16. The information processing device according to claim 1, wherein
    the operation target is an electronic device.

17. The information processing device according to claim 1, wherein the information processing device is a mobile device, and
    the operation target is an electronic device.

18. An information processing method, comprising:
    cancelling, by a processor, a selected state of a target selected as an operation target based on a detection of a posture of an information processing device; and
    determining, by the processor, a condition for cancelling the selected state based on a specific determination criterion,
    wherein the condition for canceling the selected state includes a condition that a specific time elapses from a time the target is selected as the operation target.

19. A non-transitory computer-readable medium having stored thereon, computer-executable instructions, which when executed by a processor of an information processing device, cause the processor to execute operations, the operations comprising:
    canceling a selected state of a target selected as an operation target based on a detection of a posture of the information processing device; and
    determining a condition for cancelling the selected state based on specific determination criterion,
    wherein the condition for canceling the selected state includes a condition that a specific time elapses from a time the target is selected as the operation target.

20. The information processing device according to claim 1, wherein a length of the specific time is determined based on at least one of a time necessary for a user operation to operate the operation target or a distance between a plurality of devices including the operation target.

* * * * *